(12) United States Patent
Woo et al.

(10) Patent No.: US 9,206,363 B2
(45) Date of Patent: *Dec. 8, 2015

(54) HYDROPROCESSING OF HEAVY HYDROCARBON FEEDS

(75) Inventors: Hyung Suk Woo, Easton, PA (US); Jane Chi-ya Cheng, Bridgewater, NJ (US); Teh C. Ho, Bridgewater, NJ (US); Stephen Harold Brown, Annandale, NJ (US); Richard Charles Dougherty, Moorestown, NJ (US); David Thomas Ferrughelli, Flemington, NJ (US); Federico Barrai, New York, NY (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 226 days.

This patent is subject to a terminal disclaimer.

(21) Appl. No.: 13/597,598

(22) Filed: Aug. 29, 2012

(65) Prior Publication Data

US 2013/0161237 A1 Jun. 27, 2013

Related U.S. Application Data

(60) Provisional application No. 61/529,565, filed on Aug. 31, 2011.

(51) Int. Cl.
*C10G 47/00* (2006.01)
*C10G 53/02* (2006.01)
(Continued)

(52) U.S. Cl.
CPC .................. *C10G 65/12* (2013.01); *B01J 23/74* (2013.01); *B01J 35/023* (2013.01); *B01J 35/1061* (2013.01); *B01J 37/0201* (2013.01); *B01J 37/0207* (2013.01); *B01J 37/20* (2013.01); *C10G 45/04* (2013.01); *C10G 47/02* (2013.01); *C10G 49/02* (2013.01); *C10G 49/22* (2013.01);
(Continued)

(58) Field of Classification Search
CPC ...... B01J 23/74; B01J 23/883; B01J 23/8885; B01J 35/023; B01J 35/1038; B01J 35/1042; B01J 35/1061; B01J 37/0201; B01J 37/0207; B01J 37/20; C10G 2300/202; C10G 2300/205; C10G 2300/301
USPC .......... 208/58, 78, 80, 92, 308, 309, 347, 361
See application file for complete search history.

(56) References Cited

U.S. PATENT DOCUMENTS 4,548,709 A * 10/1985 Bowes et al. ................. 208/213
4,619,759 A    10/1986 Myers et al.
2009/0166254 A1 * 7/2009 Subramanian et al. ......... 208/67

OTHER PUBLICATIONS http://www.chemspider.com/Chemical-Structure.6967.html?rid=71b43022-5666-413c-8bd2-6a6b8c0e18c8 (retrieved Jun. 6, 2014).*

(Continued)

*Primary Examiner* — In Suk Bullock
*Assistant Examiner* — Derek Mueller
(74) *Attorney, Agent, or Firm* — Larry E. Carter; Chad A. Guice

(57) ABSTRACT

Heavy oil feeds are hydroprocessed in the presence of a solvent under conditions that provide a variety of benefits. The solvent can be an added solvent or a portion of the liquid effluent from hydroprocessing. The processes allow for lower pressure processing of heavy oil feeds for extended processing times or extended catalyst lifetimes be reducing or mitigating the amount of coke formation on the hydroprocessing catalyst.

21 Claims, 4 Drawing Sheets

(51) Int. Cl.

| | |
|---|---|
| *C10G 53/04* | (2006.01) |
| *C10G 65/12* | (2006.01) |
| *C10G 47/02* | (2006.01) |
| *C10G 45/04* | (2006.01) |
| *C10G 49/02* | (2006.01) |
| *C10G 49/22* | (2006.01) |
| *C10G 67/04* | (2006.01) |
| *B01J 37/20* | (2006.01) |
| *B01J 23/74* | (2006.01) |
| *B01J 35/02* | (2006.01) |
| *B01J 37/02* | (2006.01) |
| *B01J 23/883* | (2006.01) |
| *B01J 23/888* | (2006.01) |
| *B01J 35/10* | (2006.01) |

(52) U.S. Cl.
CPC .......... *C10G67/0454* (2013.01); *B01J 23/883* (2013.01); *B01J 23/8885* (2013.01); *B01J 35/1038* (2013.01); *B01J 35/1042* (2013.01); *C10G 2300/202* (2013.01); *C10G 2300/205* (2013.01); *C10G 2300/301* (2013.01); *C10G 2300/44* (2013.01)

(56) References Cited

OTHER PUBLICATIONS

Parkash, S, Refining Processes Handbook, 2003, Gulf Publishing, p. 1-28.*

The International Search Report and Written Opinion of PCT/US2012/052975 dated Mar. 11, 2013.

"Standard Test Method for Distillation of Petroleum Products at Atmospheric Pressure", Annual Book of ASTM Standards, 2007, pp. 18-45, vol. 5.01.

* cited by examiner

HYDROPROCESSING OF HEAVY HYDROCARBON FEEDS

CROSS-REFERENCE TO RELATED APPLICATIONS

This application claims priority to U.S. Provisional Application Ser. No. 61/529,565 filed Aug. 31, 2011, herein incorporated by reference in its entirety.

FIELD OF THE INVENTION

This invention is directed to a process for producing a hydroprocessed product from residua or heavy hydrocarbon feeds.

BACKGROUND

Crude oil is typically distilled to produce a variety of components that can be used directly as fuels or that are used as feedstocks for further processing or upgrading. In what is known as atmospheric distillation, a heavy residuum is produced typically that has an initial boiling point of about 650° F. (343° C.). This residuum is typically referred to as atmospheric residuum or as an atmospheric residuum fraction.

Atmospheric residuum fractions tend to collect a relatively high quantity of various metals, sulfur components and nitrogen components relative to the lighter distillation fractions as a result of the distillation process. Because these metal, sulfur and nitrogen components are relatively undesirable in various fuels, they are typically removed by various catalytic hydroprocessing techniques.

In some instances, the atmospheric residuum is further distilled under vacuum, i.e., at a pressure below atmospheric pressure, to recover additional distillation fractions. At vacuum conditions, additional lighter fractions can be recovered without adding to various problems encountered in atmospheric distillation such as coking of the heavy fraction components. The heavy residuum recovered in vacuum distillation of the atmospheric residuum is typically referred to as vacuum residuum or a vacuum residuum fraction, and typically has an initial boiling point of about 1050° F. (566° C.). This vacuum residuum is generally higher in metals, sulfur components and nitrogen components than atmospheric residuum, and as was the case with atmospheric residuum, removal of these components can be carried out by catalytic hydroprocessing.

Catalytic hydroprocessing of atmospheric and vacuum residua is carried out in the presence of hydrogen, using a hydroprocessing catalyst. In some processes, hydroprocessing of residua is carried out by adding a diluent or solvent.

U.S. Pat. No. 3,617,525 discloses a process for removing sulfur from a hydrocarbon fraction having a boiling point above about 650° F. (343° C.). In carrying out the process, the hydrocarbon fraction is separated into a gas oil fraction having a boiling point between about 650° F. (343° C.) and about 1050° F.(566° C.), and a heavy residuum fraction boiling above about 1050° F. (566° C.). The gas oil fraction is catalytically hydrodesulfurized until the gas oil fraction contains less than 1 percent sulfur. The hydrodesulfurized gas oil is then used to dilute the heavy residuum fraction, and the diluted heavy residuum fraction is catalytically hydrodesulfurized, producing fuels or fuel blending components reduced in sulfur content. The process is considered to provide an increased catalyst life and to use a smaller reactor volume compared to typical processes.

U.S. Pat. No. 4,302,323 discloses a process for upgrading a residual petroleum fraction in which the residual fraction is mixed with a light cycle oil and hydrogen and the mixture sent through a catalytic hydrotreating zone containing a hydrotreating catalyst and then a hydrocracking zone containing a hydrocracking catalyst. Upgraded products are then separated from the effluent of the hydrocracking zone. The light cycle oil boils in the range of from 400° F. (204° C.) to 700° F. (371° C.), has a high aromatic content, and is high in nitrogen. It is considered that the light cycle oil acts more as a diluent rather than as a hydrogen donor and that the addition of the light cycle oil resulted in a substantial increase in the yield of premium products such as distillate fuels.

U.S. Pat. No. 4,421,633 discloses a combination hydrodesulfurization and hydrocracking process. The feedstock can be atmospheric residuum or vacuum residuum, which is mixed with a solvent that is a recycled distillate boiling at about 400° F.-700° F. (204° C.-371° C.), considered to be equivalent to a FCC light cycle oil. The process uses a mixture of large pore and small pore catalysts such as large pore and small pore sulfided Ni—W catalysts. The large pore catalyst has a median pore diameter of 180 Å, while the small pore catalyst has a median pore diameter of about 60 Å with no pores larger than 80 Å. The process converts the higher boiling point residua to lower boiling point hydrocarbons by forming distillate and naphtha while removing heteroatoms, metals and carbon residuals from the higher boiling point residua. It is noted that the description also includes examples where no solvent is used. The desulfurization activity in examples without solvent appears to be comparable or superior to the desulfurization activity for the examples that include a solvent.

U.S. Pat. No. 4,585,546 describes a method for hydrotreating petroleum heavy ends in aromatic solvents with large pore size alumina. The methods include processing resids mixed with a solvent such as ortho-xylene or a light cycle oil at 1000 psig (5.5 MPag) and 350° C. The resids were hydroprocessed in the presence of either a commercial hydrodesulfurization catalyst with a median pore size of 70 Å to 80 Å or a hydrodesulfurization catalyst with an alumina support having a median pore size of about 220 Å. The larger pore catalyst was shown to have higher activity for metals removal and comparable activity for sulfur removal as compared to the smaller pore catalyst.

There is a need to further develop processes for hydroprocessing heavy hydrocarbon oils to produce fuel grade products. It is also particularly desirable to provide hydroprocessing processes with improved selectivity to desired products. For example, it is desirable to provide hydroprocessing processes that crack molecules boiling at or above 1050° F. (566° C.) (also referred to as a "1050° F.+ (566° C.+) fraction" herein) into molecules boiling below 1050° F. (566° C.) (also referred to as a "1050° F.⁻ (566° C.⁻) fraction" herein), while minimizing the formation of "$C_4^-$" hydrocarbon compounds (i.e., hydrocarbon compounds having four carbons or less), and coke byproducts.

SUMMARY OF THE PREFERRED EMBODIMENTS OF THE INVENTION

In various aspects, systems and methods are provided for hydroprocessing of heavy oil feeds. In one aspect, a process for producing a hydroprocessed product includes exposing a combined feedstock comprising a heavy oil feed component and a solvent component to a hydroprocessing catalyst under effective hydroprocessing conditions to form a hydroprocessed effluent, the effective hydroprocessing conditions including a partial pressure of hydrogen of about 1000 psia (6.9 MPa) or less, such as 800 psia (5.5 MPa) or less, a temperature of at least about 360° C., such as about 380° C. to 510° C., and optionally at least about 420° C., and a liquid hourly space velocity of the fraction of the combined feedstock boiling above 1050° F. (566° C.) of at least about 0.10 hr$^{-1}$, such as at least about 0.12 hr$^{-1}$; separating the hydroprocessing effluent to form at least a liquid effluent; and fractionating a first portion of the liquid effluent to form at least a distillate product and a bottoms product, the bottoms product having an ASTM D6352 10% distillation point of at least about 600° F. (316° C.).

The solvent can be in the form of an added solvent, in the form of a recycled portion of the liquid effluent from hydroprocessing, or a combination thereof. Optionally, a portion of the bottoms product, such as a second bottoms product from a reduced pressure distillation, can be processed via solvent deasphalting to form a deasphalted oil fraction and a deasphalting residue or asphalt fraction.

In some embodiments, hydroprocessing conditions effective for conversion of at least about 90% of the feedstock relative to a conversion temperature of 1050° F. (566° C.), including a hydroprocessing temperature of at least about 420° C., can be used to form a bottoms product with an increased amount of wax relative to the feedstock. In still other embodiments, hydroprocessing conditions effective for conversion of at least about 80% of the feedstock relative to a conversion temperature of 1050° F. and for 75% desulfurization of the feedstock can be used to form a bottoms product having a sulfur content of about 1 wt % or less.

In another aspect, a process for producing a hydroprocessed product includes exposing a combined feedstock comprising a heavy oil feed component and a solvent component to a hydroprocessing catalyst comprising a Group VIII non-noble metal and a Group VI metal and having a median pore size of about 85 Å to about 120 Å, such as 85 Å to about 100 Å, under effective hydroprocessing conditions to form a hydroprocessed effluent, the effective hydroprocessing conditions including a total pressure of about 1500 psig (10.3 MPag) or less, such as a hydrogen partial pressure of about 1000 psia (6.9 MPa) or less, and a liquid hourly space velocity of the fraction of the combined feedstock boiling above 1050° F. of at least about 0.10 hr$^{-1}$, such as at least about 0.12 hr$^{-1}$; separating the hydroprocessing effluent to form at least a liquid effluent; and fractionating a first portion of the liquid effluent to form at least a distillate product and a bottoms product, the bottoms product having an ASTM D6352 10% distillation point of at least about 600° F. (316° C.). The effective hydroprocessing conditions can also include a temperature of at least about 360° C. and/or less than about 510° C., such as about 380° C. to about 460° C.

In various aspects where the solvent component includes a recycle component, the ratio of the heavy oil feed component and the recycle component can be from about 0.3 to about 6.0, such as from about 0.5 to about 5.0.

BRIEF DESCRIPTION OF THE DRAWINGS

The attached Figures represent alternative embodiments of the overall invention, as well as comparative examples. The Figures pertaining to the invention are intended to be viewed as exemplary embodiments within the scope of the overall invention as claimed.

DETAILED DESCRIPTION

Overview

Figure 1:
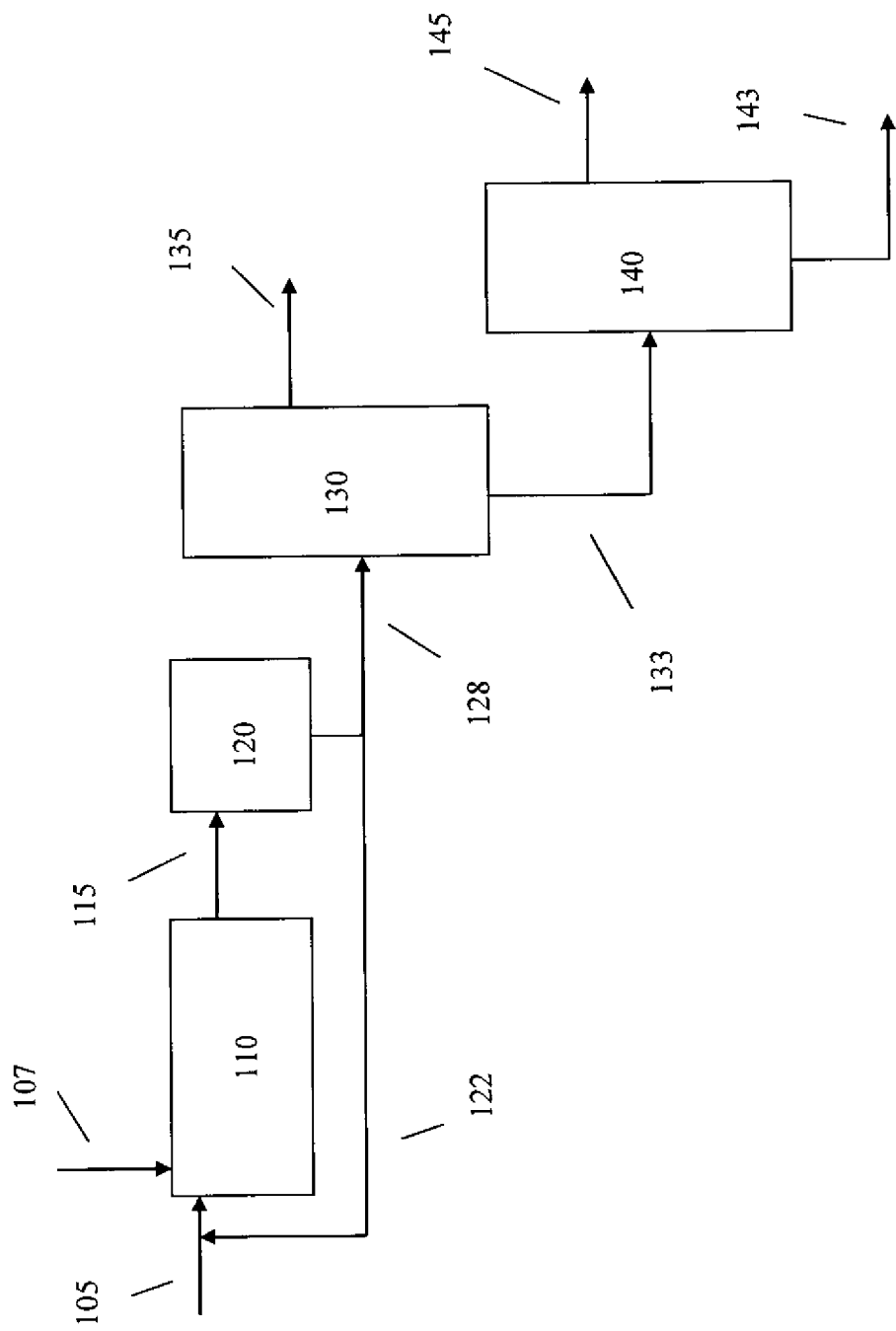
FIG. 1 shows a first preferred configuration of the process of the invention for performing hydroprocessing on a heavy oil feed.

In various aspects according to the invention, processes are provided for producing a hydroprocessed product. The process is capable of treating residua or heavy hydrocarbon oils to produce a hydroprocessed oil product that has reduced sulfur, nitrogen, metals and "1050° F.+ (566° C.+) components" (i.e., components that boil at 1050° F. (566° C.) and above) relative to the heavy oil. In some aspects, processing of heavy oils is facilitated by recycling a portion of the total liquid effluent from conversion of the heavy oil for use as a solvent as part of the input to the heavy oil hydroprocessing reaction. In other aspects, processing of heavy oils is facilitated by using a separate solvent as part of the input to the heavy oil hydroprocessing reaction. In still other aspects, the solvent component contains at least one single-ring aromatic compound. In aspects where the solvent component contains at least one single-ring aromatic compound, the solvent component preferably has an ASTM D6352 10% distillation point of at least 120° C. (248° F.) and a 90% distillation point of not greater than 300° C. (572° F.).

Depending on the embodiment, various advantages can be achieved according to the invention. One difficulty encountered during heavy oil processing is short catalyst lifetimes. Due to the nature of heavy oil feeds, conventional processing of heavy oil feeds tends to result in coking of hydroprocessing catalysts. Heavy oil feeds also typically contain high concentrations of metals that can further contribute to deactivation of hydroprocessing catalysts. In order to overcome these difficulties, catalysts with large pore size supports have been used conventionally for processing of heavy feeds, such as catalysts with pore sizes of 150 Å or more, as such catalysts are believed to provide superior lifetime. Part of the enhanced lifetime of these larger pore catalysts was believed to be due to the ability of such catalysts to remove metals from a heavy oil feed while avoiding concentration of such metals at the surface of the catalyst. Additionally, high partial pressures of hydrogen have been used to mitigate the deposition of coke on the catalyst.

In various aspects of the present invention, hydroprocessing with improved catalyst lifetime can be performed by incorporating a solvent into a heavy oil feed. By using the solvent, the feed can be hydroprocessed in the presence of a hydroprocessing catalyst at temperatures of at least about 360° C. and at hydrogen partial pressures of about 1000 psig (6.9 MPag) or less, such as about 800 psig (5.5 MPag) or less. During hydroprocessing under these reaction conditions, reactions associated with thermal cracking can also take place in the reaction environment. Conventionally, such reaction conditions would lead to severe coking of a catalyst, resulting in short catalyst lifetime. Use of a suitable solvent allows for extended catalyst lifetime while processing under such hydroprocessing conditions.

Additionally or alternately, in some aspects of the present invention methods are provided for achieving a desired level of desulfurization and removal of other contaminants from a feed while reducing the amount of aromatic saturation. This allows for increased contaminant removal without a corresponding increase in consumption of hydrogen by molecules with low hydrogen to carbon ratios.

Conventionally, processing of heavy oil fractions has required processing at hydrogen pressures of at least 1500 psig (10.3 MPag) and a large ratio of hydrogen treat gas to feedstock flow. Under these conditions, hydrogen can be consumed by a variety of side reactions that may not be desirable. For example, some polynuclear aromatic (PNA) cores have a low ratio of hydrogen to carbon, and a substantial hydrogen investment is required to convert such PNA cores to distillate or naphtha fuels. More generally, the excess of hydrogen required under typical conditions results in saturation of a variety of aromatic molecules that may not need hydrogenation to be included in a beneficial product fraction. As a result, the consumption of hydrogen during conventional processing of heavy oils can be high relative to the stoichiometric need for desired reactions. By reducing the amount of aromatic saturation that occurs at a given level of feed conversion, the ratio of hydrogen consumed by desired reactions versus hydrogen consumed by side reactions can be increased. In some aspects, the decrease in the relative amount of aromatic saturation is facilitated by use of a small pore hydroprocessing catalyst.

In still other aspects, methods are provided for separating out molecules with low hydrogen to carbon ratios from higher value molecules at reduced levels of conversion of the heavy components. In a typical heavy oil feedstock, a portion of the heavy oil feedstock can correspond to molecules with high molecular weight and low hydrogen to carbon ratios, such as asphaltenes or other polynuclear aromatics. These less desirable molecules, however, have similar boiling ranges to some molecules that are desirable from a processing standpoint, such as molecules with higher hydrogen to carbon ratios. One method for recovering the desirable molecules is to subject a heavy oil feed to hydroprocessing conditions capable of converting a high percentage of the 1050° F.+ (566° C.+) portion of the feed, such as conditions suitable for converting at least 80 wt % of the 1050° F.+ (566° C.+) portion of the feed to components with a boiling point of less than 1050° F. (566° C.). Under these severe hydroprocessing conditions, the more desirable molecules can be converted to lower boiling point species, but typically at the cost of subjecting the entire feed to more severe conditions. This additional severity can lead to both over-conversion of desirable products to lower value species, excess consumption of hydrogen by aromatic saturation of less desirable molecules, and rapid catalyst deactivation. Conventionally, low value molecules are removed from a fraction containing higher value molecules by converting a large percentage of the low value molecules via addition of hydrogen, such as conversion of at least about 80 wt % of the component compounds in the feed that have boiling points of 1050° F. (566° C.) or greater. The remaining unconverted portion of the feed, containing primarily lower value compounds, can then be separated out as a bottoms portion during a fractionation. While this increases the hydrogen content of the low value molecules, it is often an undesirable process in terms of the amount of hydrogen (and other costs) required to upgrade the low value molecules in comparison with the resulting value of the upgraded molecules.

In contrast to conventional methods, various aspects of the invention described herein allow for hydroprocessing of a feed to achieve a lower level of conversion, such as conversion of about 50 wt % to about 70 wt % of the portion of the feed that boils at 1050° F. (566° C.) or greater. This reduces the number of low value molecules that are upgraded using hydrogen. Instead of performing further feed conversion to capture the remaining higher value (i.e., higher hydrogen to carbon ratio) molecules while rejecting the lower value molecules, the unconverted portion of the feed is then exposed to a solvent deasphalting process. This allows for separation of molecules with low hydrogen to carbon ratios as the residual side product from the deasphalting process. The hydrogen to carbon ratio of the molecules in the residual side product from deasphalting can be similar to the hydrogen to carbon ratio of the bottoms product from a higher severity hydroconversion process.

Additionally or alternately, in some aspects processes are provided for using small pore hydroprocessing catalysts for hydroprocessing of the heavy oil. Hydroprocessing catalysts with median pore diameters of about 85 Å to about 120 Å have conventionally been used for hydroprocessing of lower boiling feedstocks, such as distillate feeds. However, such smaller pore catalysts have not traditionally been used for heavy oil processing due to poor catalyst lifetime and difficulties with plugging of catalyst beds in fixed bed reactors. By recycling a portion of the total liquid effluent from hydroprocessing of the heavy oil and/or using a suitable solvent, it has been discovered that smaller pore catalysts can be used while maintaining improved catalyst lifetimes for the processing.

In yet other aspects of the invention, processes are provided that allow for creation of beneficial products from hydroprocessing of a heavy oil fraction. For example, a heavy oil fraction can be hydroprocessed and then fractionated to form a bottoms fraction that is enriched in wax. Such a product can be suitable, for example, for use as a feed in a wax production plant. This can allow a less valuable bottoms product to be used in place of a (typically) more valuable vacuum gas oil product as the feed for wax production.

As still another example, a heavy oil fraction can be hydroprocessed to produce a low sulfur fuel oil. Historically, little or no restriction has been placed on the sulfur content of bunker fuel or fuel oil. This allowed heavy oil fractions with sulfur contents as high as 4 wt % or 5 wt % to be sold as fuel oils. However, current and future regulations may restrict the sulfur content of fuel oils to lower values. Due to such tighter sulfur content restrictions, fuel oils with reduced sulfur contents will become increasingly valuable. In some embodiments, processing a heavy oil fraction according to the invention can allow for production of a bottoms fraction from a vacuum tower into a fuel oil, or more specifically a Bunker C Fuel Oil, with a sulfur content of less than about 1 wt %, or even less than about 0.1 wt %. Such a low sulfur fuel oil is valuable for use as a fuel or for blending with other fuel oil fractions to reduce the overall sulfur content of a blend of fuel oil fractions. Bunker C Fuel Oils are typically used as maritime shipping fuels and are heavy fuels that typically have a wide distillation range of about 575 to 1500° F. (302 to 816° C.), with usually more than about 75 wt % boiling above about 750° F. (399° C.).

Definitions

In order to clarify the description of the invention, the following definitions are provided. The following definitions should be applied throughout the description herein unless otherwise specified.

In some embodiments of the invention, reference is made to conversion of a feedstock relative to a conversion temperature T. Conversion relative to a temperature T is defined based on the portion of the feedstock that boils at a temperature greater than the conversion temperature T. The amount of conversion during a process (or optionally across multiple processes) is defined as the weight percentage of the feedstock that is converted from boiling at a temperature above the conversion temperature T to boiling at a temperature below the conversion temperature T. For example, consider a feedstock that includes 40 wt % of components that boils at 1050° F. (566° C.) or greater. By definition, the remaining 60 wt % of the feedstock boils at less than 1050° F. (566° C.). For such a feedstock, the amount of conversion relative to a conversion temperature of 1050° F. (566° C.) would be based only on the 40 wt % that initially boils at 1050° F. (566° C.) or greater. If such a feedstock is exposed to a process with 30% conversion relative to a 1050° F. (566° C.) conversion temperature, the resulting product would include 72 wt % of components boiling below 1050° F. (566° C.) and 28 wt % of components boiling above 1050° F. (566° C.).

In various aspects of the invention, reference may be made to one or more types of fractions generated during distillation of a petroleum feedstock. Such fractions may include naphtha fractions, kerosene fractions, diesel fractions, and vacuum gas oil fractions. Each of these types of fractions can be defined based on a boiling range, such as a boiling range that includes at least 90 wt % of the fraction, and preferably at least 95 wt % of the fraction. For example, for many types of naphtha fractions, at least 90 wt % of the fraction, and preferably at least 95 wt %, can have a boiling point in the range of 85° F. (29° C.) to 350° F. (177° C.). For some heavier naphtha fractions, at least 90 wt % of the fraction, and preferably at least 95 wt %, can have a boiling point in the range of 85° F. (29° C.) to 400° F. (204° C.). For a kerosene fraction, at least 90 wt % of the fraction, and preferably at least 95 wt %, can have a boiling point in the range of 300° F. (149° C.) to 600° F. (288° C.). Alternatively, for a kerosene fraction targeted for some uses, such as jet fuel production, at least 90 wt % of the fraction, and preferably at least 95 wt %, can have a boiling point in the range of 300° F. (149° C.) to 550° F. (288° C.). For a diesel fraction, at least 90 wt % of the fraction, and preferably at least 95 wt %, can have a boiling point in the range of 400° F. (204° C.) to 750° F. (399° C.). For a vacuum gas oil fraction, at least 90 wt % of the fraction, and preferably at least 95 wt %, can have a boiling point in the range of 650° F. (343° C.) to 1100° F. (593° C.). Optionally, for some vacuum gas oil fractions, a narrower boiling range may be desirable. For such vacuum gas oil fractions, at least 90 wt % of the fraction, and preferably at least 95 wt %, can have a boiling point in the range of 650° F. (343° C.) to 1000° F. (538° C.).

Heavy Oil Feed

In various aspects, a hydroprocessed product is produced from a heavy oil feed component. Examples of heavy oils include, but are not limited to, heavy crude oils, distillation residues, heavy oils coming from catalytic treatment (such as heavy cycle oils from fluid catalytic cracking), thermal tars (such as oils from visbreaking or similar thermal processes), oils (such as bitumen) from oil sands and heavy oils derived from coal.

Heavy oils can be liquid, semi-solid, and/or solid. Additional examples of particular heavy oils that can be hydroprocessed, treated or upgraded according to this invention include Athabasca bitumen, vacuum resid from Brazilian Santos and Campos basins, Egyptian Gulf of Suez, Chad, Venezuelan Zulia, Malaysia, and Indonesia Sumatra. Other examples of heavy oil include residuum from refinery distillation processes, including atmospheric and vacuum distillation processes. Such heavy oils can have an initial ASTM D6352 boiling point of 650° F. (343° C.) or greater. Preferably, the heavy oils will have an ASTM D6352 10% distillation point of at least 650° F. (343° C.), alternatively at least 660° F. (349° C.) or at least 750° F. (399° C.). In some aspects the D6352 10% distillation point can be still greater, such as at least 950° F. (510° C.), or at least 1020° F. (549° C.), or at least 1050° F. (566° C.).

In addition to initial boiling points and/or 10% distillation points, other distillation points may also be useful in characterizing a feedstock. For example, a feedstock can be characterized based on the portion of the feedstock that boils above 1050° F. (566° C.). In some aspects, a feedstock can have an ASTM D6352 70% distillation point of 1050° F. (566° C.) or greater, or a 60% distillation point of 1050° F. (566° C.) or greater, or a 50% distillation point of 1050° F. (566° C.) or greater, or a 40% distillation point of 1050° F. or greater.

Still another way of characterizing a feedstock is by characterizing the flow rate of a portion of the feed relative to the amount of catalyst being used for processing the feed. For example, the portion of a feedstock that boils at about 1050° F. (566° C.) or above is often a more difficult portion of a feedstock to process. As a result, the practical flow rate for a feedstock is influenced by the amount of the feedstock that boils above 1050° F. relative to the amount of hydroprocessing catalyst. In some aspects, the liquid hourly space velocity of the 1050° F.+(566° C.+) portion of a combined feedstock (including both fresh feed and solvent) relative to hydroprocessing catalyst can be at least about 0.05 hr$^{-1}$, such as at least about 0.10 hr$^{-1}$, or at least about 0.12 hr$^{-1}$, or at least about 0.15 hr$^{-1}$, or at least about 0.20 hr$^{-1}$.

Heavy oils can be relatively high in total acid number (TAN). TAN can be expressed in terms of mg of KOH per g of heavy oil. For example, some heavy hydrocarbon oils that can be optionally hydroprocessed according to this invention have a TAN of at least 0.1, at least 0.3, or at least 1.

Density, or weight per volume, of the heavy hydrocarbon can be determined according to ASTM D287-92 (2006) Standard Test Method for API Gravity of Crude Petroleum and Petroleum Products (Hydrometer Method), and is provided in terms of API gravity. In general, the higher the API gravity, the less dense the oil. API gravity is at most 20° in one aspect, at most 15° in another aspect, and at most 10° in another aspect.

Heavy oils can be high in metals. For example, the heavy oil can be high in total nickel, vanadium and iron contents. In one embodiment, the heavy oil will contain at least 0.00005 grams of Ni/V/Fe (50 ppm) or at least 0.0002 grams of Ni/V/Fe (200 ppm) per gram of heavy oil, on a total elemental basis of nickel, vanadium and iron.

Contaminants such as nitrogen and sulfur are typically found in heavy oils, often in organically-bound form. Nitrogen content can range from about 50 wppm to about 6000 wppm elemental nitrogen, or about 1000 wppm to about 5000 wppm elemental nitrogen, or about 200 wppm to about 3500 wppm, based on total weight of the heavy hydrocarbon component. The nitrogen containing compounds can be present as basic or non-basic nitrogen species. Examples of basic nitrogen species include quinolines and substituted quinolines. Examples of non-basic nitrogen species include carbazoles and substituted carbazoles.

The invention is particularly suited to treating heavy oils containing at least 500 wppm elemental sulfur, based on total weight of the heavy oil. Generally, the sulfur content of such heavy oils can range from about 500 wppm to about 100,000 wppm elemental sulfur, or from about 1000 wppm to about 60,000 wppm, or from about 5000 wppm to about 50,000 wppm, based on total weight of the heavy component. In embodiments, the heavy oil feed component can contain at least 1 wt %, at least 2 wt %, or even at least 3 wt % sulfur. Sulfur will usually be present as organically bound sulfur. Examples of such sulfur compounds include the class of heterocyclic sulfur compounds such as thiophenes, tetrahydrothiophenes, benzothiophenes and their higher homologs and analogs. Other organically bound sulfur compounds include aliphatic, naphthenic, and aromatic mercaptans, sulfides, di- and polysulfides.

Heavy oils can be high in n-pentane asphaltenes. In some aspects, the heavy oil can contain at least about 5 wt % of n-pentane asphaltenes, such as at least about 10 wt % or at least 15 wt % n-pentane asphaltenes.

Solvent

In various aspects of the invention, the hydroprocessing of a heavy oil feed component is facilitated by adding a solvent component. Two types of solvent components are contemplated in various aspects. One type of solvent component is a solvent component that contains at least one single-ring aromatic ring compound, and more preferably more than one single-ring aromatic ring compound. The solvent is also a low boiling solvent relative to the heavy hydrocarbon oil. By the term "single-ring aromatic compound" as used herein, it is defined as a hydrocarbon compound containing only one cyclic ring wherein the cyclic ring is aromatic in nature.

For a solvent component containing at least one single-ring aromatic compound, the solvent preferably has an ASTM D86 90% distillation point of less than 300° C. (572° F.). Alternatively, the solvent has an ASTM D86 90% distillation point of less than 250° C. (482° F.) or less than 200° C. (392° F.). Additionally or alternately, the solvent can have an ASTM D86 10% distillation point of at least 120° C. (248° F.), such as at least 140° C. (284° F.) or at least 150° C. (302° F.).

The single-ring aromatic compound or compounds in particular have relatively low boiling points compared to the heavy hydrocarbon oil. Preferably, none of the single-ring aromatic compounds of the solvent has a boiling point of greater than 550° F. (288° C.), or greater than 500° F. (260° C.), or greater than 450° F. (232° C.), or greater than 400° F. (204° C.).

The single-ring aromatic can include one or more hydrocarbon substituents, such as from 1 to 3 or 1 to 2 hydrocarbon substituents. Such substituents can be any hydrocarbon group that is consistent with the overall solvent distillation characteristics. Examples of such hydrocarbon groups include, but are not limited to, those selected from the group consisting of $C_1$-$C_6$ alkyl and $C_1$-$C_6$ alkenyl, wherein the hydrocarbon groups can be branched or linear and the hydrocarbon groups can be the same or different. A particular example of such a single-ring aromatic that includes one or more hydrocarbon substituents is trimethylbenzene (TMB).

The solvent preferably contains sufficient single-ring aromatic component(s) to effectively increase run length during hydroprocessing. For example, the solvent can be comprised of about 20 wt % to about 80 wt % of the single ring aromatic component, such as at least 50 wt % of the single-ring aromatic component, or at least 60 wt %, or at least 70 wt %, based on total weight of the solvent component.

The density of the solvent component can also be determined according to ASTM D287-92 (2006) Standard Test Method for API Gravity of Crude Petroleum and Petroleum Products (Hydrometer Method) in terms of API gravity. API gravity of the solvent component is at most 350 in one aspect, at most 30° in another aspect, and at most 25° in another aspect.

In other aspects of the invention, the solvent component can correspond to a recycle stream of a portion of the liquid effluent or product generated from the hydroprocessing reaction. The recycle stream can be a portion of the total liquid effluent, or the recycle stream can include a portion of one or more distillation fractions of the liquid product from hydroprocessing. An example of a recycle stream corresponding to a portion of a distillation fraction is a recycle stream corresponding to a portion of the distillate boiling range product from hydroprocessing of the heavy feed.

Recycling a portion of the total liquid effluent for use as a solvent provides a variety of advantages. Because the recycled portion is a part of the total liquid effluent, a separation does not have to be performed to recover the solvent after hydroprocessing. Instead, the output effluent from hydroprocessing can simply be divided to form a product stream and a recycle stream. In some embodiments, fractionation of the total liquid product may not occur until after additional processing is performed, such as additional hydroprocessing to remove contaminants or improve cold flow properties. Recycling a portion of the total liquid effluent means that fully hydroprocessed products are not recycled to an early stage, which can increase the available processing volume for later hydroprocessing stages.

Optionally, other portions of the hydroprocessed product may be recycled in addition to the portion of the total liquid effluent. For example, after withdrawing the recycle stream portion of the total liquid effluent, the remaining portion of the total liquid effluent may be separated or fractionated to form various fractions, such as one or more naphtha fractions, one or more kerosene and/or distillate fractions, one or more atmospheric or vacuum gas oil fractions, and a bottoms or resid fraction. A portion of one or more of these product fractions can also be recycled for use as part of the combined hydroprocessing feed. For example, a portion of a kerosene product fraction or distillate product fraction can be recycled and combined with the heavy oil feed and the recycled portion of the total liquid effluent to form the hydroprocessing feed. These recycled product fractions, based on recycle of one or more fractions that have a narrower boiling range than the total liquid product, can correspond to at least about 2 wt % of the combined hydroprocessing feed, such as at least about 5 wt % or at least about wt %. Such recycled product fractions can correspond to about 50 wt % or less of the combined hydroprocessing feed, and preferably about 25 wt % of the combined hydroprocessing feed or less, such as about 15 wt % or less or 10 wt % or less.

One potential concern with using a product fraction as a recycle stream is the possibility of further conversion of the recycled product fraction during hydroprocessing. For example, a product fraction where 90 wt % of the product fraction boils in a boiling range of 300° F. (149° C.) to 600° F. (316° C.) corresponds to a kerosene fraction. Further conversion of this product fraction when used as a recycle solvent would result in formation of additional components with boiling points less than 300° F. (149° C.). Such low boiling point components correspond to either naphtha or light ends, which are lower value fractions. Preferably, less than 10 wt % of a product fraction is converted to components with a boiling point below the boiling range of the product fraction when exposed to the hydroprocessing environment as a recycle solvent, and more preferably less than 5 wt % of a recycled product fraction undergoes conversion.

In an alternative aspect of the invention, the total liquid effluent from the hydroprocessing reaction can be fractionated, so that the only recycle inputs to the hydroprocessing feed are recycled portions from the product fractions. In this type of aspect, the amount of recycled product fractions can correspond to at least about 10 wt % of the hydroprocessing feed, such as at least about 20 wt %. The amount of recycled product fractions can correspond to about 50 wt % or less, such as about 30 wt % or less. Suitable product fractions for recycle include kerosene fractions, distillate (including diesel) fractions, gas oil fractions (including atmospheric and vacuum gas oils), and combinations thereof.

The solvent component should be combined with the heavy hydrocarbon oil component to effectively increase run length during hydroprocessing. For example, the solvent and heavy hydrocarbon component can be combined so as to produce a combined feedstock that is comprised of from 10 wt % to 90 wt % of the heavy hydrocarbon oil component and from 10 wt % to 90 wt % of the solvent component, based on total weight of the combined feed. Alternatively, the solvent and heavy hydrocarbon component are combined so as to produce a combined feedstock that is comprised of from 30 wt % to 80 wt % of the heavy hydrocarbon oil component and from 20 wt % to 70 wt % of the solvent component, based on total weight of the combined feed. In some aspects, the solvent component is about 50 wt % or less of the combined feedstock, such as about 40 wt % or less or about 30 wt % or less. In other aspects where at least a portion of the solvent component corresponds to a recycled portion of the total liquid effluent, the solvent component can be greater than 50 wt % of the combined feedstock.

Another way of characterizing an amount of feedstock relative to an amount of solvent component, such as a recycle component, is as a ratio of solvent component to feedstock. For example, the ratio of solvent component to feedstock on a weight basis can be at least about 0.2, such as from about 0.3 to about 6.0, and preferably at least about 0.5 and/or less than about 5.0 or less than about 3.0.

The solvent can be combined with the heavy hydrocarbon oil within the hydroprocessing vessel or hydroprocessing zone. Alternatively, the solvent and heavy hydrocarbon oil can be supplied as separate streams and combined into one feed stream prior to entering the hydroprocessing vessel or hydroprocessing zone.

In still another option, instead of feeding a solvent component corresponding to a recycled portion of the total liquid effluent into a reactor from the reactor inlet, part of the solvent may be fed to the reactor via interbed quench zones. This would allow the solvent to help control reaction exothermicity (adiabatic temperature rise) and improve the liquid flow distribution in the reactor bed.

Hydroprocessing Catalysts

The catalysts used for hydroconversion of a heavy oil feed can include conventional hydroprocessing catalysts, such as those that comprise at least one Group VIII non-noble metal (Columns 8-10 of IUPAC periodic table), preferably Fe, Co, and/or Ni, such as Co and/or Ni; and at least one Group VI metal (Column 6 of IUPAC periodic table), preferably Mo and/or W. Such hydroprocessing catalysts optionally include transition metal sulfides that are impregnated or dispersed on a refractory support or carrier such as alumina and/or silica. The support or carrier itself typically has no significant/measurable catalytic activity. Substantially carrier- or support-free catalysts, commonly referred to as bulk catalysts, generally have higher volumetric activities than their supported counterparts.

The catalysts can either be in bulk form or in supported form. In addition to alumina and/or silica, other suitable support/carrier materials can include, but are not limited to, zeolites, titania, silica-titania, and titania-alumina. It is within the scope of the invention that more than one type of hydroprocessing catalyst can be used in one or multiple reaction vessels.

The at least one Group VIII non-noble metal, in oxide form, can typically be present in an amount ranging from about 2 wt % to about 30 wt %, preferably from about 4 wt % to about 15 wt %. The at least one Group VI metal, in oxide form, can typically be present in an amount ranging from about 2 wt % to about 60 wt %, preferably from about 6 wt % to about 40 wt % or from about 10 wt % to about 30 wt %. These weight percents are based on the total weight of the catalyst. It is noted that under hydroprocessing conditions, the metals may be present as metal sulfides and/or may be converted metal sulfides prior to performing hydroprocessing on an intended feed.

A vessel or hydroprocessing zone in which catalytic activity occurs can include one or more hydroprocessing catalysts. Such catalysts can be mixed or stacked, with the catalyst preferably being in a fixed bed in the vessel or hydroprocessing zone.

The support can be impregnated with the desired metals to form the hydroprocessing catalyst. In particular impregnation embodiments, the support is heat treated at temperatures in a range of from 400° C. to 1200° C. (752° F. to 2192° F.), or from 450° C. to 1000° C. (842° F. to 1832° F.), or from 600° C. to 900° C. (1112° F. to 1652° F.), prior to impregnation with the metals.

In an alternative embodiment, the hydroprocessing catalyst is comprised of shaped extrudates. The extrudate diameters range from $\frac{1}{32}$nd to $\frac{1}{8}^{th}$ inch, from $\frac{1}{20}^{th}$ to $\frac{1}{10}^{th}$ inch, or from $\frac{1}{2}^{th}$ to $\frac{1}{16}^{th}$ inch. The extrudates can be cylindrical or shaped. Non-limiting examples of extrudate shapes include trilobes and quadralobes.

The process of this invention can be effectively carried out using a hydroprocessing catalyst having any median pore diameter effective for hydroprocessing the heavy oil component. For example, the median pore diameter can be in the range of from 30 to 1000 Å (Angstroms), or 50 to 500 Å, or 60 to 300 Å. Pore diameter is preferably determined according to ASTM Method D4284-07 Mercury Porosimetry.

In a particular embodiment, the hydroprocessing catalyst has a median pore diameter in a range of from 50 to 200 Å. Alternatively, the hydroprocessing catalyst has a median pore diameter in a range of from 90 to 180 Å, or 100 to 140 Å, or 110 to 130 Å.

The process of this invention is also effective with hydroprocessing catalysts having a larger median pore diameter. For example, the process can be effective using a hydroprocessing catalyst having a median pore diameter in a range of from 180 to 500 Å, or 200 to 300 Å, or 230 to 250 Å.

It is preferred that the hydroprocessing catalyst have a pore size distribution that is not so great as to negatively impact catalyst activity or selectivity. For example, the hydroprocessing catalyst can have a pore size distribution in which at least 60% of the pores have a pore diameter within 45 Å, 35 Å, or 25 Å of the median pore diameter. In certain embodiments, the catalyst has a median pore diameter in a range of from 50 to 180 Å, or from 60 to 150 Å, with at least 60% of the pores having a pore diameter within 45 Å, 35 Å, or 25 Å of the median pore diameter.

In some alternative embodiments, the process of this invention can be effectively carried out using a hydroprocessing catalyst having a median pore diameter of at least 85 Å, such as at least 90 Å, and a median pore diameter of 120 Å or less, such as 105 Å or less. This can correspond, for example, to a catalyst with a median pore diameter from 85 Å to 120 Å, such as from 85 Å to 100 Å or from 85 Å to 98 Å. In certain alternative embodiments, the catalyst has a median pore diameter in a range of from 85 Å to 120 Å, with at least 60% of the pores having a pore diameter within 45 Å, 35 Å, or 25 Å of the median pore diameter.

Pore volume should be sufficiently large to further contribute to catalyst activity or selectivity. For example, the hydroprocessing catalyst can have a pore volume of at least 0.3 cm³/g, at least 0.7 cm³/g, or at least 0.9 cm³/g. In certain embodiments, pore volume can range from 0.3-0.99 cm³/g, 0.4-0.8 cm³/g, or 0.5-0.7 cm³/g.

In certain aspects, the catalyst exists in shaped forms, for example, pellets, cylinders, and/or extrudates. The catalyst typically has a flat plate crush strength in a range of from 50-500 N/cm, or 60-400 N/cm, or 100-350 N/cm, or 200-300 N/cm, or 220-280 N/cm.

In some aspects, a combination of catalysts can be used for hydroprocessing of a heavy oil feed. For example, a heavy oil feed can be contacted first by a demetallation catalyst, such as a catalyst including NiMo or CoMo on a support with a median pore diameter of 200 Å or greater. A demetallation catalyst represents a lower activity catalyst that is effective for removing at least a portion of the metals content of a feed. This allows a less expensive catalyst to be used to remove a portion of the metals, thus extending the lifetime of any subsequent higher activity catalysts. The demetallized effluent from the demetallation process can then be contacted with a catalyst having a different median pore diameter, such as a median pore diameter of 85 Å to 120 Å.

Processing Conditions

Hydroprocessing (alternatively hydroconversion) generally refers to treating or upgrading the heavy hydrocarbon oil component that contacts the hydroprocessing catalyst. Hydroprocessing particularly refers to any process that is carried out in the presence of hydrogen, including, but not limited to, hydroconversion, hydrocracking (which includes selective hydrocracking), hydrogenation, hydrotreating, hydrodesulfurization, hydrodenitrogenation, hydrodemetallation, hydrodearomatization, hydroisomerization, and hydrodewaxing including selective hydrocracking. The hydroprocessing reaction is carried out in a vessel or a hydroprocessing zone in which heavy hydrocarbon and solvent contact the hydroprocessing catalyst in the presence of hydrogen.

Contacting conditions in the contacting or hydroprocessing zone can include, but are not limited to, temperature, pressure, hydrogen flow, hydrocarbon feed flow, or combinations thereof. Contacting conditions in some embodiments are controlled to yield a product with specific properties.

Hydroprocessing is carried out in the presence of hydrogen. A hydrogen stream is, therefore, fed or injected into a vessel or reaction zone or hydroprocessing zone in which the hydroprocessing catalyst is located. Hydrogen, which is contained in a hydrogen "treat gas," is provided to the reaction zone. Treat gas, as referred to herein, can be either pure hydrogen or a hydrogen-containing gas, which is a gas stream containing hydrogen in an amount that is sufficient for the intended reaction(s), optionally including one or more other gasses (e.g., nitrogen and light hydrocarbons such as methane), and which will not adversely interfere with or affect either the reactions or the products. Impurities, such as $H_2S$ and $NH_3$ are undesirable and would typically be removed from the treat gas before it is conducted to the reactor. The treat gas stream introduced into a reaction stage will preferably contain at least about 50 vol. % and more preferably at least about 75 vol. % hydrogen.

Hydrogen can be supplied at a rate of from 1000 SCF/B (standard cubic feet of hydrogen per barrel of total feed) (178 S m³/m³) to 10000 SCF/B (1780 S m³/m³). Preferably, the hydrogen is provided in a range of from 2000 SCF/B (356 S m³/m³) to 5000 SCF/B (891 S m³/m³).

Hydrogen can be supplied co-currently with the heavy hydrocarbon oil and/or solvent or separately via a separate gas conduit to the hydroprocessing zone. The contact of the heavy hydrocarbon oil and solvent with the hydroprocessing catalyst and the hydrogen produces a total product that includes a hydroprocessed oil product, and, in some embodiments, gas.

The temperature in the contacting zone can be at least about 680° F. (360° C.), such as at least about 700° F. (371° C.), and preferably at least about 716° F. (380° C.), such as at least about 750° F. (399° C.) or at least about 788° F. (420° C.). Additionally or alternately, the temperature in the contacting zone can be about 950° F. (510° C.) or less, such as about 900° F. (482° C.) or less, and preferably about 869° F. (465° C.) or less or about 842° F. (450° C.) or less.

Total pressure in the contacting zone can range from 200 psig (1379 kPa-g) to 3000 psig (20684 kPa-g), such as from 400 psig (2758 kPa-g) to 2000 psig (13790 kPa-g), or from 650 psig (4482 kPa-g) to 1500 psig (10342 kPa-g), or from 650 psig (4482 kPa-g) to 1200 psig (8273 kPa-g). Preferably, a heavy oil can be hydroprocessed under low hydrogen partial pressure conditions. In such aspects, the hydrogen partial pressure during hydroprocessing can be from about 200 psia (1379 kPa) to about 1000 psia (6895 kPa), such as from 500 psia (3447 kPa) to about 800 psia (5516 kPa). Additionally or alternately, the hydrogen partial pressure can be at least about 200 psia (1379 kPa), or at least about 400 psia (2758 kPa), or at least about 600 psia (4137 kPa). Additionally or alternately, the hydrogen partial pressure can be about 1000 psia (6895 kPa) or less, such as about 900 psia (6205 kPa) or less, or about 850 psia (5861 kPa) or less, or about 800 psia (5516 kPa) or less, or about 750 psia (5171 kPa) or less. In such aspects with low hydrogen partial pressure, the total pressure in the reactor can be about 1200 psig (8274 kPa-g) or less, and preferably 1000 psig (6895 kPa-g) or less, such as about 900 psig (6205 kPa-g) or less or about 800 psig (5516 kPa-g) or less.

Liquid hourly space velocity (LHSV) of the combined heavy hydrocarbon oil and recycle components will generally range from 0.1 to 30 h$^{-1}$, or 0.4 h$^{-1}$ to 20 h$^{-1}$, or 0.5 to 10 h$^{-1}$. In some aspects, LHSV is at least 15 h$^{-1}$, or at least 10 h$^{-1}$, or at least 5 h$^-$. Alternatively, in some aspects LHSV is about 2.0 h$^{-1}$ or less, or about 1.5 h$^{-1}$ or less, or about 1.0 h$^{-1}$ or less.

Based on the reaction conditions described above, in various aspects of the invention, a portion of the reactions taking place in the hydroprocessing reaction environment can correspond to thermal cracking reactions. In addition to the reactions expected during hydroprocessing of a feed in the presence of hydrogen and a hydroprocessing catalyst, thermal cracking reactions can also occur at temperatures of 360° C. and greater. In the hydroprocessing reaction environment, the presence of hydrogen and catalyst can reduce the likelihood of coke formation based on radicals formed during thermal cracking.

In an embodiment of the invention, contacting the input feed to the hydroconversion reactor with the hydroprocessing catalyst in the presence of hydrogen to produce a hydroprocessed product is carried out in a single contacting zone. In another aspect, contacting is carried out in two or more contacting zones.

In various embodiments of the invention, the combination of processing conditions can be selected to achieve a desired level of conversion of a feedstock. For various types of heavy oil feedstocks, conversion relative to a conversion temperature of 1050° F. (566° C.) is a convenient way to characterize the amount of feedstock conversion. For example, the process conditions can be selected to achieve at least about 25% conversion of the 1050° F.+ portion of a feedstock. In other words, the conditions are selected so that at least about 25 wt % of the portion of the feed that boils above 1050° F. (566° C.) is converted to a portion that boils below 1050° F. (566° C.).

In some aspects, the amount of conversion relative to 1050° F. (566° C.) can be at least about 40%, such as at least about 50% or at least about 60%. Additionally or alternately the conversion percentage can be about 80% or less, such as about 75% or less or about 70% or less. An example of a suitable amount of conversion can be a conversion percentage from about 40% to about 80%, such as about 50% to about 70%.

In other embodiments of the invention, a greater amount of conversion may be desirable. For example, in order to segregate molecules with low hydrogen to carbon ratios using hydroprocessing, a conversion percentage of at least about 80% can be desirable, such as at least about 85%, or at least about 90%. Additionally or alternately, the conversion percentage can be about 95% or less, such as about 90% or less. These levels of conversion can also be useful, for example, for concentrating wax in the 650° F.+(343° C.+) or 700° F.+ (371° C.+) portion of a feedstock, or for forming a low sulfur fuel oil. Optionally, a feedstock with a sulfur content of about 3.0 wt % or less can be used when these higher levels of conversion are desired.

Hydroprocessed Product

Relative to the heavy oil feed component in the feedstream, the hydroprocessed product will be a material or crude product that exhibits reductions in such properties as average molecular weight, boiling point range, density and/or concentration of sulfur, nitrogen, oxygen, and metals.

In an embodiment of the invention, contacting the heavy oil feed component and recycle or other solvent component with the hydroprocessing catalyst in the presence of hydrogen to produce a hydroprocessed product is carried out in a single contacting zone. In another embodiment, contacting is carried out in two or more contacting zones. The total hydroprocessed product can be separated to form one or more particularly desired liquid products and one or more gas products.

In some embodiments of the invention, the liquid product is blended with a hydrocarbon feedstock that is the same as or different from the heavy oil feed component. For example, the liquid hydroprocessed product can be combined with a hydrocarbon oil having a different viscosity, resulting in a blended product having a viscosity that is between the viscosity of the liquid hydroprocessed product and the viscosity of the heavy oil feed component.

In some embodiments of the invention, the hydroprocessed product and/or the blended product are transported to a refinery and distilled to produce one or more distillate fractions. The distillate fractions can be catalytically processed to produce commercial products such as transportation fuel, lubricants, or chemicals. A bottoms fraction can also be produced, such as bottoms fraction with an ASTM D6352 10% distillation point of at least about 600° F. (316° C.), or an ASTM D6352 10% distillation point of at least about 650° F. (343° C.), or a bottoms fraction with a still higher 10% distillation point, such as at least about 750° F. (399° C.) or at least about 800° F. (427° C.).

In some embodiments of the invention, the hydroprocessed product has a total Ni/V/Fe content of at most 50%, or at most 30%, or at most 10%, or at most 5%, or at most 1% of the total Ni/V/Fe content (by wt%) of the heavy oil feed component. In certain embodiments, the fraction of the hydroprocessed product that has an ASTM D6352 10% distillation point of at least about 650° F. (343° C.) and higher (i.e., 650° F.+ product fraction) has, per gram of 650° F.+ (343° C.+) product fraction, a total Ni/V/Fe content in a range of from $1 \times 10^{-7}$ grams to $2 \times 10^{-4}$ grams (0.1 to 200 ppm), or $3 \times 10^{-7}$ grams to $1 \times 10^{-4}$ grams (0.3 to 100 ppm), or $1 \times 10^{-6}$ grams to $1 \times 10^{-4}$ grams (1 to 100 ppm). In certain embodiments, the 650° F.+ (343° C.+) product fraction has not greater than $4 \times 10^{-5}$ grams of Ni/V/Fe (40 ppm).

In certain embodiments of the invention, the hydroprocessed product has an API gravity that is 100-160%, or 110-140% of that of the heavy oil feed component. In certain embodiments, API gravity of the hydroprocessed product is from 10°-40°, or 12°-35°, or 14°-30°.

In certain embodiments of the invention, the hydroprocessed product has a viscosity of at most 90%, or at most 80%, or at most 70% of that of the heavy oil feed component. In some embodiments, the viscosity of the hydroprocessed product is at most 90% of the viscosity of the heavy oil feed component, while the API gravity of the hydroprocessed product is 100-160%, or 105-155%, or 110-150% of that of the heavy oil feed component.

In an alternative embodiment, the 650° F.+ (343° C.+) product fraction can have a viscosity at 100° C. of 10 to 150 cst, or 15 to 120 cst, or 20 to 100 cst. Most atmospheric resids of crude oils range from 40 to 200 cst. In certain embodiments, 650° F.+ (343° C.+) product fraction has a viscosity of at most 90%, or at most 50%, or at most 5% of that of the heavy oil feed component.

In some embodiments of the invention, the hydroprocessed product has a total heteroatom (i.e., S/N/O) content of at most 50%, or at most 25%, or at most 10%, or at most 5% of the total heteroatom content of the heavy oil feed component.

In some embodiments of the invention, the sulfur content of the hydroprocessed product is at most 50%, or at most 10%, or at most 5% of the sulfur content (by wt %) of the heavy oil feed component. The total nitrogen content of the hydroprocessed product is at most 85%, or at most 50%, or at most 25% of the total nitrogen (by wt %) of the heavy oil feed component.

In still other embodiments of the invention, the 650° F.+ (343° C.+) product fraction can have an increased content of waxy molecules relative to the wax content of the feedstock. Under hydroprocessing conditions including a temperature of at least about 420° C., such as at least about 440° C., and a partial pressure of hydrogen of less than about 1000 psia (6.9 MPa) and/or a total pressure of less than about 1000 psig (6.9 MPag), alkylaromatic molecules with boiling points in the vacuum gas oil range (>650° F. or 343° C.) are selectively cracked to form 650° F.+ (343° C.+) aliphatic (and preferably paraffinic) molecules and aromatics. Prior to hydroprocessing, these molecules would not be classified as waxy molecules due to the aromatic portions of the molecules. After hydroprocessing, the 650° F.+ (343° C.+) product fraction can be enriched in waxy molecules due to the formation of distinct aliphatic and aromatic molecules based on the high boiling aromatic molecules. Preferably, when formation of a product fraction enriched in waxy molecules is desired, the feedstock to the hydroprocessing reaction can have an ASTM D6352 10% distillation point of at least about 900° F. (482° C.), and more preferably at least about 950° F. (510° C.). Using a feedstock with a reduced amount of lower boiling material is helpful for subsequent separation of wax from the hydroprocessed effluent. In some embodiments, the bottoms fraction used for wax recovery can correspond to a higher boiling fraction, such as a 750° F.+ (399° C.+) bottoms fraction, or an 800° F.+ (427° C.+) bottoms fraction.

The selective production in the process of the invention of 650° F.+ (343° C.+) wax and 650° F.+ (343° C.+) polynuclear aromatics with short side chains from atmospheric and vacuum resids of crude oil is unexpected based in part on the unusual reaction conditions. At these conditions, the preferred reaction pathway for alkylaromatics is thermal cracking, while hydrogenation of alkylaromatics to saturated, vacuum gas oil boiling range liquids is suppressed. This is unexpected, because thermal cracking is generally believed to have poor selectivity. The expected result under thermal cracking conditions is for alkylaromatics, alkylnaphthenes, paraffins, and isoparaffins in the vacuum gas oil boiling range to all crack, resulting in production of $C_4$−, naphtha, and distillate boiling range molecules at similar rates from all of the various initial molecules. Instead, it has been discovered alkylaromatics thermally crack much faster than paraffins and isoparaffins, enabling the production of a vacuum gas oil saturates fraction that is highly enriched in wax. This result has not been previously found in part due to the rapid coking that occurs during hydroprocessing of vacuum gas oil, atmospheric resid, and/or vacuum resid fractions under conventional conditions. Fouling and incompatibility hinders operation of waxy vacuum gas oils and resids even in slurry phase and ebullating bed hydrocrackers. Furthermore, slurry and ebullating beds operate in the bulk liquid phase, and are known to have poor thermal cracking selectivity because of liquid phase mass transport limitations. Additionally, the result cannot be observed at partial pressures of hydrogen greater than 1000 psia (6.9 MPa), due to the shift in the equilibrium toward increased hydrogenation of aromatics at higher pressures.

In addition to allowing for production of wax from high boiling alkylaromatic compounds, the reaction conditions also assist in producing a higher purity wax product. Due to the low hydrogen partial pressure used for thermally cracking the alkylaromatic compounds to form wax, an increased percentage of the resulting aromatic compounds are not saturated or otherwise hydrogenated. By allowing the aromatic compounds to retain their aromaticity, the aromatic compounds can subsequently be removed from the wax product by a conventional method, such as solvent extraction. Using a higher (conventional) partial pressure of hydrogen of more than 1000 psia (6.9 MPa), more of the aromatic compounds would be saturated, resulting in naphthenes that cannot be as readily separated using solvent extraction.

In some embodiments, processes according to the invention can also be used for production of low sulfur fuel oil, such as a fuel oil with a sulfur content of about 1 wt % or less. The higher severity hydroprocessing conditions suitable for wax concentration, such as a temperature of at least about 420° C., preferably at least about 440° C., are also suitable for increasing the percentage of sulfur removal from a feed. Under reaction conditions suitable for at least about 80% conversion of the 1050° F.+ (566° C.+) portion of the feed, and preferably at least about 90% conversion, an 800° F.+ (427° C.+) bottoms product can be generated with a sulfur concentration of less than 1wt %. This 800° F.+ (427° C.+) bottoms product is suitable for use as a low sulfur fuel oil. Such hydroprocessing conditions are also suitable for at least 75% desulfurization of the feedstock, such as at least about 80% desulfurization or at least about 90% desulfurization. For example, for a feed having an initial concentration of about 4wt%, at least 75% desulfurization is required to achieve a low sulfur fuel oil with a sulfur concentration of about 1wt% or less. Such levels of desulfurization can be achieved by using conditions severe enough to produce at least 80% conversion of a feed based on a 1050° F. (566° C.) conversion temperature, such as at least 90% conversion. Optionally, the feed used for forming the low sulfur fuel oil can be a feed with a higher boiling range, such as a feed with an ASTM D6352 10% distillation point of at least about 900° F. (482° C.), and more preferably at least about 950° F. (510° C.).

If it is desirable to generate a wax from the 800° F.+ (427° C.+) product generated by hydroprocessing of a feed, the wax in the 800° F.+ (427° C.+) product can be separated out. The remaining portion of the 800° F.+ (427° C.+) product can then be used as a low sulfur fuel oil. In an alternative embodiment, an initial feed can be used that has a low initial wax content and/or separation of wax from the 800° F.+ (427° C.+) product may not be desired. In such an alternative embodiment, the 800° F.+ (427° C.+) product can be used as a low sulfur fuel oil without prior removal or separation of wax.

Example of Processing Configuration

FIG. 1 schematically shows an example of a configuration suitable for hydroprocessing a heavy oil feedstock. In FIG. 1, a feedstock 105 comprising at least a portion of a heavy oil feed component is passed into a hydroprocessing reaction zone 110. A hydrogen stream 107 is also introduced into the hydroprocessing reaction zone 110. Hydrogen stream 107 is shown as being introduced separately into reaction zone 110, but hydrogen stream 107 can also be mixed with feedstock 105 prior to entering reaction zone 110. In the configuration shown in FIG. 1, feedstock 105 is mixed with a recycle portion 122 of the liquid effluent that has been separated from the hydroprocessing reaction zone effluent, prior to the mixture entering the hydroprocessing reaction zone 105. Alternatively, the recycle portion 122 can be mixed with feedstock 105 in the hydroprocessing reaction zone 110. As still another alternative, a separate solvent can be added in place of or in addition to recycle portion 122.

Preferably hydroprocessing reaction zone 110 can be operated to achieve a desired level of conversion, such as a desired level of conversion relative to a 1050° F. (566° C.) conversion temperature. The effluent 115 from reaction zone 105 is passed into a separator 120, such as a high pressure separator. The separator 120 can separate a gas phase portion of effluent 115 from a liquid phase portion of the effluent. The gas phase portion of effluent 115 can optionally include a portion of molecules that would typically be considered as part of the naphtha boiling range. In the configuration shown in FIG. 1, the liquid phase portion is then split into recycle portion 122 and a product portion 128.

In the configuration shown in FIG. 1, the product portion 128 of the liquid effluent from hydroprocessing reactor 110 is separated in an atmospheric distillation tower 130 or another type of separator suitable for performing a comparable fractionation. The atmospheric distillation unit 130 fractionates product portion 128 to form at least a distillate product portion 135 and a bottoms portion 133. Optionally, a naphtha boiling range portion (not shown) can also be produced, if naphtha boiling range molecules are still present in product portion 128. Optionally, more than one distillate boiling range fraction can be generated, such as a kerosene portion and a diesel portion.

The bottoms portion 133 is then passed into a vacuum distillation unit 140 or another comparable type of separator that performs a fractionation in an environment with a reduced pressure (i.e., a pressure that is less than atmospheric). The vacuum distillation unit 140 forms at least one vacuum gas oil portion 145 and a vacuum bottoms portion 143. The vacuum gas oil portion 145 can be suitable for further processing, such as additional hydroprocessing or other processing to form fuels or lubricants, or as a feed for a fluid catalytic cracker. The bottoms portion can be used for forming fuel oils, asphalts, or other types of high boiling products.

In an alternative configuration, the bottoms 133 from atmospheric distillation unit 130 can be used as a product without separation in a vacuum distillation unit 140. For example, the bottoms 133 can be used as a feed for a wax production plant.

Deasphalting of Hydroconverted Effluent

The configuration shown in FIG. 1 is an example of a configuration where hydroprocessing is performed on a heavy oil feedstock, followed by separation of product fractions for further use. One alternative to the type of configuration shown in FIG. 1 is to include solvent deasphalting of at least a portion of the hydroprocessed effluent. Solvent deasphalting allows for separation of asphaltenes from a remaining portion of a feed. Asphaltenes are typically molecules that require substantial addition of hydrogen in order to make a molecule suitable for use as a fuel. Solvent deasphalting allows these lower value molecules to be separated out on a basis other than boiling point, so that higher value molecules with similar boiling points, such as molecules with similar boiling points but higher hydrogen content, can be retained as part of the feedstock.

Solvent deasphalting is a solvent extraction process. Suitable solvents include alkanes or other hydrocarbons containing about 3 to about 6 carbons per molecule. Examples of suitable solvents include propane, n-butane, isobutene, and n-pentane. Alternatively, other types of solvents may also be suitable, such as supercritical fluids. During solvent deasphalting, a feed portion is mixed with the solvent. Portions of the feed that are soluble in the solvent are then extracted, leaving behind a residue with little or no solubility in the solvent. Preferred solvent deasphalting conditions for processes of the invention include mixing a feedstock fraction with a solvent in a weight ratio of from about 1:2 to about 1:10, such as about 1:8 or less. Preferred solvent deasphalting temperatures for processes of the invention range from about 40° C. to about 200° C. The pressure during solvent deasphalting can be from about 50 psig (345 kPag) to about 500 psig (3447 kPag).

The portion of the feedstock that is extracted with the solvent is often referred to as deasphalted oil. In various embodiments of the invention, solvent deasphalting can be performed on the bottoms from atmospheric distillation or on a portion of the bottoms from atmospheric distillation. For example, the bottoms from vacuum distillation represents a portion of the atmospheric distillation bottoms that can be used as the feed to the solvent deasphalter. A portion of vacuum gas oil can also be used as a feed to a solvent deasphalting process, either alone or in combination with at least a portion of vacuum distillation bottoms.

The yield of deasphalted oil from the solvent extraction process varies depending on a variety of factors, including the nature of the feedstock, the type of solvent, and the solvent extraction conditions. A lighter molecular weight solvent such as propane will result in a lower yield of deasphalted oil as compared to n-pentane, as fewer components of the heavy oil will be soluble in the shorter chain alkane. However, the deasphalted oil resulting from propane deasphalting is typically of higher quality, resulting in expanded options for use of the deasphalted oil. Under preferred deasphalting conditions, increasing the temperature will also usually reduce the yield while increasing the quality of the resulting deasphalted oil. In various embodiments of the present invention, the yield of deasphalted oil from solvent deasphalting can be about 85 wt % or less of the feed to the deasphalting process, or about 75 wt % or less. In other embodiments, solvent deasphalting conditions are selected so that the yield of deasphalted oil is at least about 25 wt %, such as at least about 45 wt % or at least about 70 wt %.

After the deasphalting process, the yield of deasphalting residue can be at least about 15 wt % of the feed to the deasphalting process. The yield of deasphalting residue is preferably up to about 75 wt % or less, but is preferably about 35 wt % or less, such as about 30 wt % or less or 25 wt % or less. The deasphalting residue can be used, for example, for making various grades of asphalt. A deasphalting residue is sometimes referred to using the number of carbons in the solvent used for deasphalting. For example, a solvent deasphalting process using n-pentane will produce a deasphalted oil and a $C_5$ deasphalting residue.

In some aspects of the invention, solvent deasphalting can be used to segregate molecules with lower hydrogen content. This can allow the hydroprocessing reaction to be performed under less severe conditions, so that segregation of lower hydrogen content molecules from higher hydrogen content molecules is based on solubility rather than based on boiling point. Segregating molecules with lower hydrogen content is beneficial for several reasons. First, such lower hydrogen content molecules require the greatest hydrogen consumption in order to convert the molecules to a more desirable product, such as a fuel or lubricant base oil. Additionally, such lower hydrogen content molecules tend to have poor properties, such as unfavorable flow properties and/or high levels of contaminants. Thus, one of the goals of processing a feedstock is to either separate such low hydrogen content molecules out from the higher value molecules, or to add enough hydrogen to the low hydrogen content molecules to increase the value of the initially low hydrogen content molecules. From a resource standpoint, separation of the low hydrogen content molecules would be preferable, in order to reduce the severity of reaction conditions as well as to avoid excessive hydrogen consumption. Combining hydroprocessing with solvent deasphalting allows for use of such lower severity conditions while still effectively separating out low hydrogen content molecules.

For example, using only hydroprocessing, conditions sufficient to achieve a conversion percentage of at least about 80 wt % of the 1050° F. (566° C.) portion of the feed, such as at least about 85 wt %, are required to effectively segregate lower hydrogen content molecules within a heavy oil feed. By contrast, using a combination of solvent deasphalting and hydroprocessing, the hydroprocessing conditions can be selected to achieve a conversion of only 50% to 70% of the 1050° F.+ (566° C.+) portion of the feed. This is a significantly less severe level of conversion. The effluent from hydroprocessing is then solvent deasphalted. The deasphalting residue can have a similar hydrogen content profile as the unconverted portion from the more severe hydroprocessing conditions.

Additional Examples of Process Configurations

Figure 2:
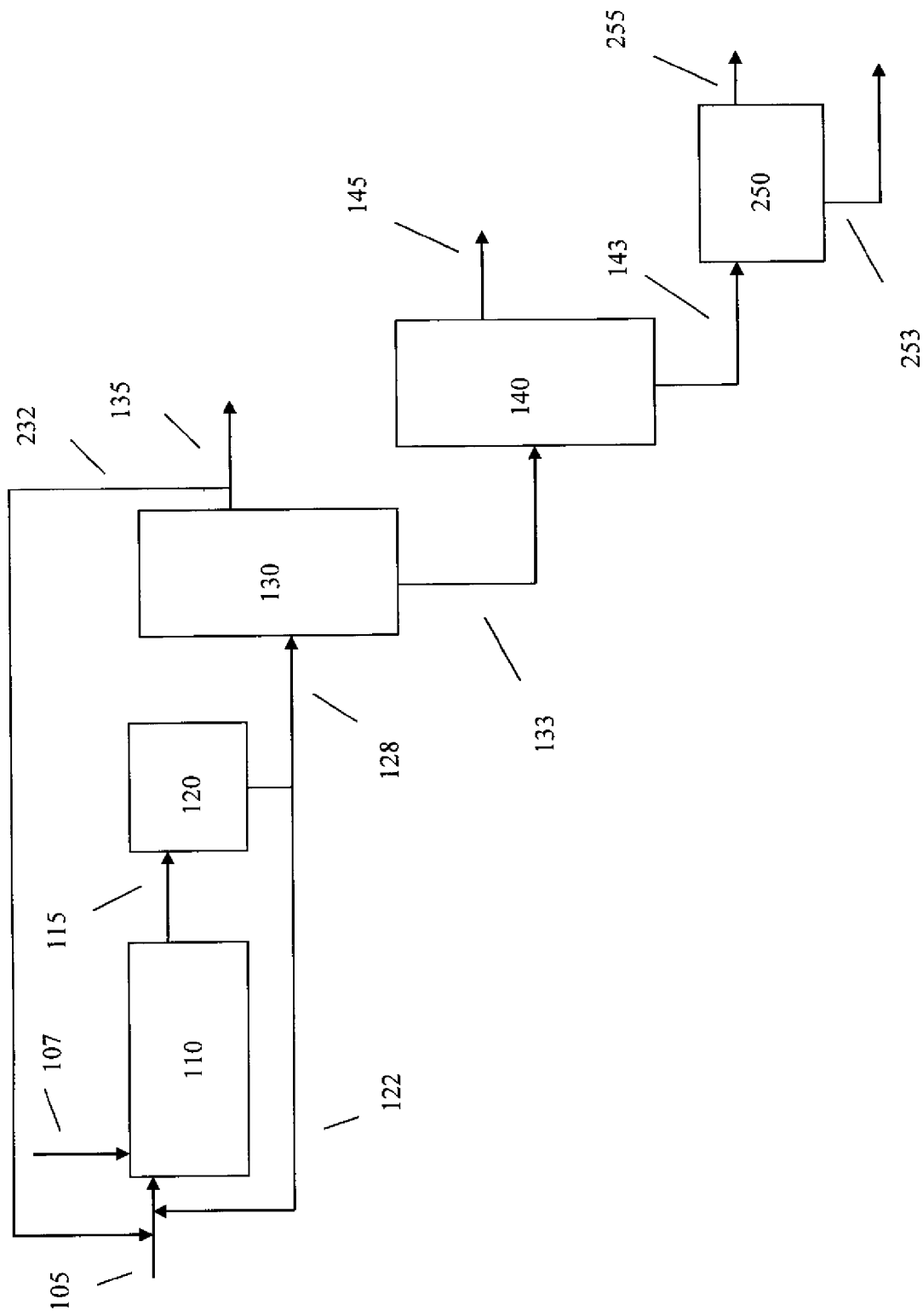
FIG. 2 shows a second preferred configuration of the process of the invention for performing hydroprocessing on a heavy oil feed.
Figure 3:
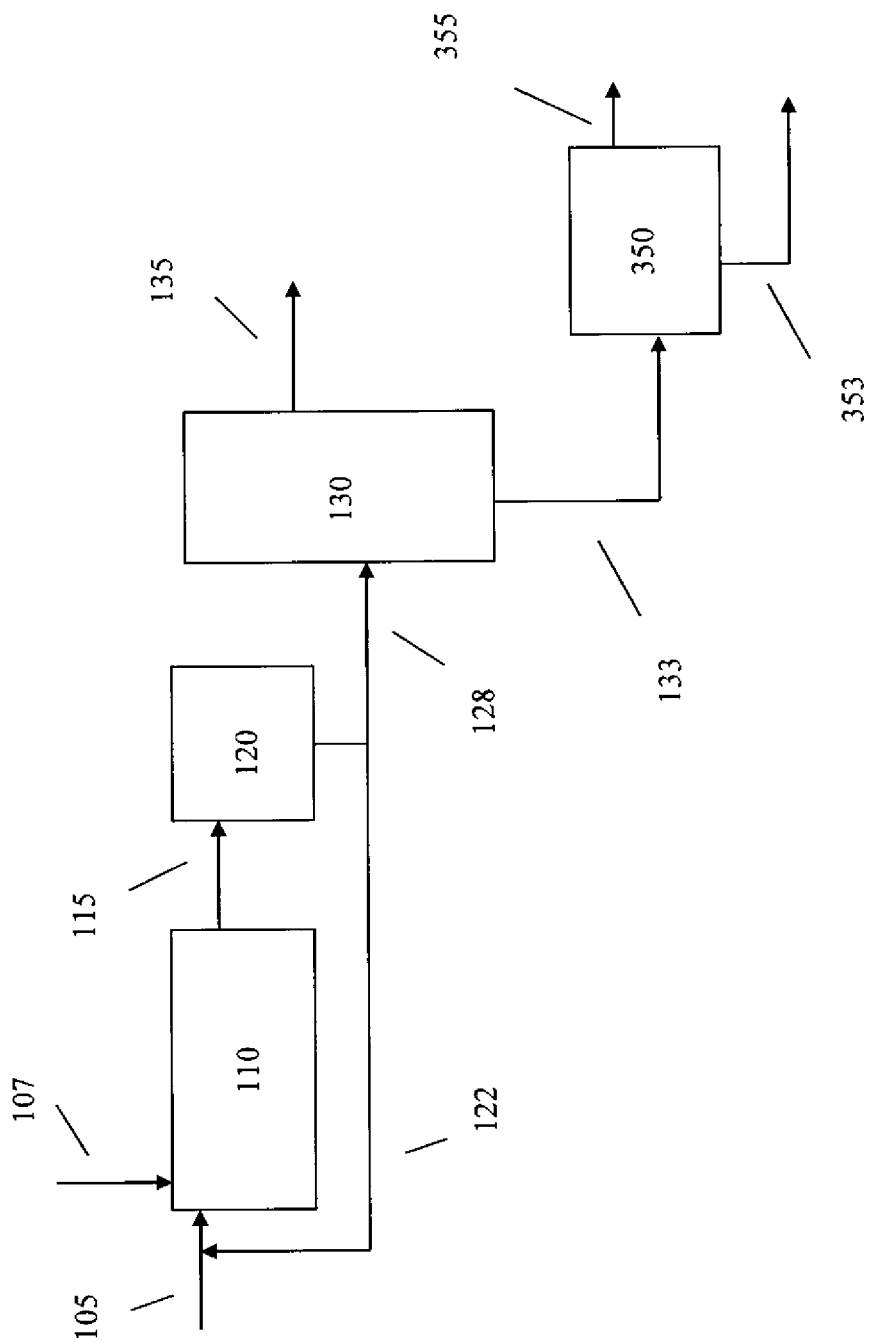
FIG. 3 shows a third preferred configuration of the process of the invention for performing hydroprocessing on a heavy oil feed.
Figure 4:
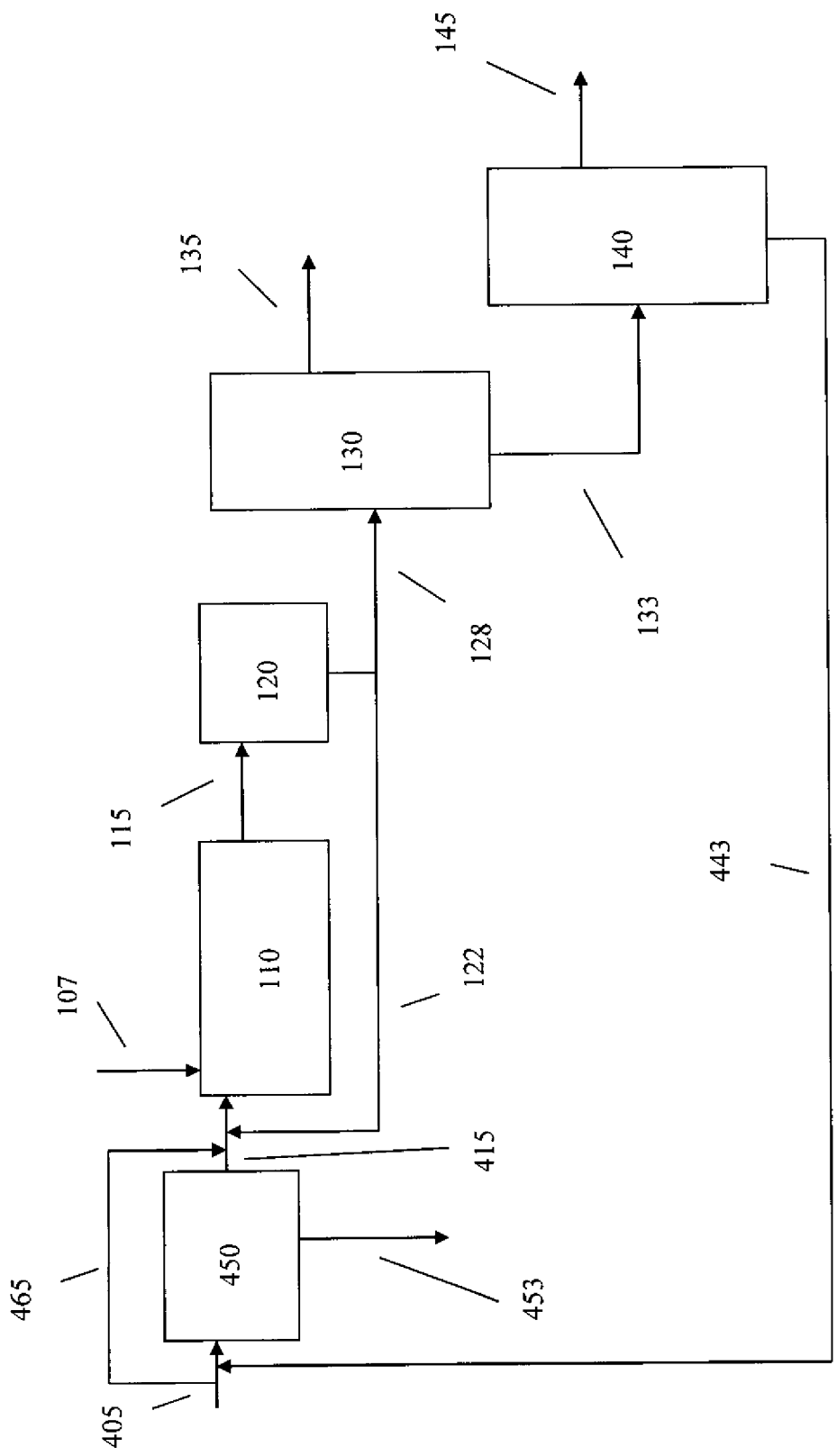
FIG. 4 shows a fourth preferred configuration of the process of the invention for performing hydroprocessing on a heavy oil feed.

FIGS. 2-4 show various embodiments of processing configurations of the present invention that include a solvent deasphalting step for deasphalting at least a portion of the effluent from hydroprocessing. For example, FIG. 2 shows a configuration where solvent deasphalting is performed on the bottoms from a fractionator that performs separations in a reduced pressure environment (such as a vacuum distillation unit). Instead of using the entire reduced pressure fractionation bottoms as a fuel oil product, performing solvent deasphalting can allow the reduced pressure fractionation bottoms to be separated into a deasphalted oil portion suitable for use as a heavy vacuum gas oil and a residual asphalt portion.

In the configuration shown in FIG. 2, many of the elements of the configuration are similar to FIG. 1. In the embodiment shown in FIG. 2, the bottoms fraction 143 from the vacuum distillation unit is passed into a solvent deasphalting unit 250. The solvent deasphalting unit 250 generates a deasphalted oil product 255 and a deasphalting residue or asphalt product 253. The deasphalted oil product 255 can be recycled for further hydroprocessing in hydroprocessing unit 110, subject to further hydroprocessing or other processing in another reactor in a refinery (such as by using deasphalted oil product 255 as a heavy vacuum gas oil feed), or the deasphalted oil product 255 can be used as a fuel oil.

FIG. 2 also shows an optional recycle 232 of a portion of the distillate product for combination with the other portions used as feed to the hydroprocessing reaction 110. The optional distillate recycle component 232 can provide further solvent for use improving hydroprocessing reaction 110. Optionally, distillate recycle component 232 can correspond to a recycle of a portion of the distillate product, such as a recycle of a kerosene fraction of the distillate product.

FIG. 3 shows another process embodiment of the invention that incorporates a solvent deasphalting unit. In the configuration shown in FIG. 3, a vacuum distillation tower is not used. Instead, the bottoms fraction 133 from atmospheric distillation unit 130 is passed into a solvent deasphalting unit 350. This results in a deasphalted atmospheric bottoms product 355 and an asphalt product 353. The configuration shown in FIG. 3 can be beneficial for reducing energy consumption, as vacuum distillation is one of the more energy intensive processes in a refinery.

Additionally, the configuration shown in either FIG. 2 or FIG. 3 can be useful for allowing segregation of low hydrogen to carbon ratio molecules into a residual product (such as the asphalt product) while using milder reaction conditions that convert about 50 wt % to about 70 wt % of the 1050° F.+ (566° C.+) portion of the feedstock. To achieve a comparable amount of segregation of low hydrogen to carbon ratio molecules using hydroprocessing, conversion levels of at least 80 wt % or more of the 1050° F.+ (566° C.+) portion of the feedstock may be needed.

FIG. 4 shows yet another process embodiment of the invention that incorporates a solvent deasphalting unit. The type of configuration shown in FIG. 4 is useful for reducing the amount of fuel oil and other higher boiling products in favor of generation of more fuels and other distillate products. In FIG. 4, the bottoms fraction 443 from vacuum distillation 140 is recycled and combined with a portion of the input feedstock 405. The combined vacuum bottoms and a first portion of feedstock 405 are passed into a solvent deasphalting unit 450. This results in an asphalt product 453 and a deasphalted feed 415. The deasphalted feed 415 is then combined with a second portion 465 of the feedstock. A portion of the liquid effluent from hydroprocessing 122 is also added to this combination of feedstock materials. The combination of feedstock materials is then hydroprocessed 110 according to any of the various conditions described herein.

PROCESS EXAMPLES

Example 1

A fixed bed reactor was constructed from ¼ inch stainless steel tubing. The reactor included two 50 cm brass half cylinders that were bolted onto a ¼ inch stainless steel tube. The volume of the hot zone inside the brass cylinder was 6.0 cc's. A fixed bed reactor was loaded with a homogeneous blended mixture of 5.6 cc of 15-40 mesh sand and 1.4 cc of a supported NiMo hydroprocessing catalyst sized to 20-40 mesh. The blended mixture was centered on the hot zone. The rest of the reactor tube (the cold zones at the top and bottom of the reactor tube) was filled with 15-40 mesh sand. The supported NiMo catalyst was typical of those used commercially for removing metals from heavy oil feedstocks and had a median pore size of greater than 150 Å. The reactor was mounted into a fixed bed, upflow pilot unit. The fresh feedstock was 95 wt % Athabasca bitumen/5 wt % of partially hydrogenated 1-methylnaphthalene (0.95 g/cc at 60° F. or 16° C.). The 5 wt % of 1-methylnaphthalene was added to facilitate the start of the process run until recycled liquid product was available for use as a solvent. 16 wt % of the fresh feedstock was blended with 84 wt % of the $C_6+$ liquid produced by the process (the total liquid product or TLP). The bitumen feedstock contained 40 vol % of 1050° F.+ (566° C.+) resid. The sulfur, nitrogen, and oxygen contents were 4.75 wt %, 0.5 wt %, and 0.2 wt % respectively. The API gravity was 10 (1.0 g/cc). The feedstock contained 40 wppm nickel, 100 wppm vanadium, 8 wppm iron, and 5 wppm of other ash-forming elements. Process conditions were a hydrogen treat gas flow rate of 670 SCF/B (about 110 $Nm^3/m^3$) of hydrogen, a temperature of 430° C., a total liquid feedstock flow rate of 21 cc/hr (corresponds to 2.5 $hr^{-1}$ LHSV based on volume of fresh bitumen per volume of NiMo hydroprocessing catalyst per hour), and a total pressure of 800 psig (5.5 MPag).

The product from the unit was run through a hot separator held at 50° C. followed by a cold knock-out pot held at 5° C. The total liquid product recovered had a mass between 93 and 95% of the mass of the liquid feed. The volume and composition of the unit offgas were measured. Both hydrogen consumption and the extent of sulfur removal were also measured. The unit ran smoothly for 25 days (1500 volumes of fresh bitumen per volume of NiMo hydroprocessing catalyst) and then plugged due to deposition of coke and metals on the catalyst bed.

The API gravity of the bitumen feed was 13. The API gravity of the $C_6+$ total liquid product was 18.

Example 2 (Comparative)

A fixed bed reactor was constructed from ¼ inch stainless steel tubing. The reactor included two 50 cm brass half cylinders that were bolted onto a ¼ inch stainless steel tube. The volume of the hot zone inside the brass cylinder was 6.0 cc's. A fixed bed reactor was loaded with a homogeneous blended mixture of 4.2 cc of 15-40 mesh sand and 2.8 cc of a supported NiMo hydroprocessing catalyst sized to 20-40 mesh. The blended mixture was centered on the hot zone. The rest of the reactor tube (the cold zones at the top and bottom of the reactor tube) was filled with 15-40 mesh sand. The supported NiMo catalyst was typical of those used commercially for removing metals from heavy oil feedstocks and had a median pore size of greater than 150 Å. The reactor was mounted into a fixed bed, upflow pilot unit. The feedstock was 70 wt % Athabasca bitumen/30 wt % of partially hydrogenated 1-methylnaphthalene (0.95 g/cc at 60° F.). The bitumen feedstock contained 40 vol % 1050+ resid. The sulfur, nitrogen, and oxygen contents were 4.75 wt %, 0.5 wt %, and 0.2 wt % respectively. The API gravity was 10 (1.0 g/cc). The feedstock contained 40 wppm nickel, 100 wppm vanadium, 8 wppm iron, and 5 wppm other ash-forming elements. Process conditions were a hydrogen treat gas flow rate of 670 SCF/B (about 110 $Nm^3/m^3$) of hydrogen, a temperature of 430° C., a total liquid feedstock flow rate of 21 cc/hr (corresponds to 2.0 $hr^{-1}$ LHSV based on volume of fresh bitumen per volume of NiMo hydroprocessing catalyst per hour), and a total pressure of 800 psig (5.5 MPag).

The product from the unit was run through a hot separator held at 50° C. followed by a cold knock-out pot held at 5° C. The total liquid product recovered had a mass between 93 and 95% of the mass of the liquid feed. The volume and composition of the unit offgas was measured. Both hydrogen consumption and the extent of sulfur removal were measured. The unit ran smoothly for 18 days (900 volumes of fresh bitumen per volume of NiMo hydroprocessing catalyst) and then plugged due to deposition of coke and metals on the catalyst bed.

The API gravity of the bitumen feed was 13. The API gravity of the $C_4+$ total liquid product was 18.

Based on a comparison of examples 1 and 2, using a recycled portion of the total liquid product provided a superior performance vs. once-through operation with a solvent. The cycle length was extended from 900 volumes of fresh bitumen per volume of hydroprocessing catalyst to 1500 volumes of fresh bitumen per volume of catalyst. Thus, even though the ratio of recycle solvent to feedstock was greater than the ratio of added solvent (1-methylnaphthalene) to feedstock, the amount of fresh bitumen processed using the recycle solvent was still greater.

Example 3

A fixed bed, upflow reactor was constructed from $\frac{3}{8}^{th}$ inch stainless steel tubing. Two 50 cm brass half cylinders were bolted onto the $\frac{3}{8}^{th}$ inch tube. The volume of the hot zone inside the brass cylinder was 16.0 cc's. The reactor was loaded with 3 g (4.9 cc) of a supported NiMo hydroprocessing catalyst on top of 9 g (8.1 cc) of a commercially available bulk NiMoW hydroprocessing catalyst. The supported NiMo catalyst was used primarily for removing metals from heavy oil feedstocks and had a median pore size of greater than 150 Å. The median pore diameter of the bulk NiMoW catalyst was 94 Å, as shown in Table 1 below. The catalyst system was sulfided using a feedstock comprised of 80 wt % 130-neutral lube oil/20 wt % ethyl-disulfide.

The feedstock for sulfiding the catalyst system was processed at 3000 SCF/B (standard cubic feet of hydrogen per barrel of feed, about 500 $Nm^3/m^3$), at 340° C. (644° F.), 0.17 LHSV (liquid hourly space velocity), and 1000 psig (6895 kPa) for 48 hours. The feedstock was then switched to 60 wt % Athabasca bitumen/40 wt % trimethylbenzene (TMB). Reaction conditions were changed to 800 psig (5516 kPa-g), 5 cc/hr liquid feed (corresponding to an LHSV of 0.39 volumes of fresh bitumen per volume of bulk NiMoW hydroprocessing catalyst per hour), and 1100 SCF/B hydrogen (197 S $m^3/m^3$). The reactor temperature was varied between 689° F. (365° C.) and 780° F. (416° C.).

The Athabasca bitumen had the following properties: 4.8 wt % S, 5000 wppm N, 55% wt % o of the feed having a boiling point between 450° F. to 1050° F. (232° C. to 566° C.), 45 wt % of the feed corresponding to a 1050° F.+ (566° C.+) fraction, 0.9950 specific gravity at 60° F. (15.6° C.), 67 wppm Ni, 166 wppm V, and 13 wppm Fe.

During the run, the hydrodesulfurization and hydrodmetallization levels were typically held between 60 and 70% through temperature adjustment. The deposition of metals in the reactor was tracked with time. For example, at the time that the catalyst had accumulated 5 wt % metals, the conditions were 800 psig (5516 kPa-g) and 725° F. (385° C.). Less than 1 wt % of the TMB was hydrogenated and/or hydrocracked.

The catalyst was run for 150 days, resulting in processing of 2368 volumes of bitumen per volume of NiMoW hydroprocessing catalyst. The HDS activity of the catalyst dropped by less than 1% over a 3 week period at a temperature as high as 780° F. (416° C.). The run was voluntarily terminated to enable examination of the metals distribution on the catalyst before metal loading filled any more of the catalyst void volume.

Upon ending the run, the catalysts were analyzed for vanadium profile in the extrudates. The vanadium deposit across whole extrudates was found to be evenly deposited throughout the extrudate on both catalysts, which was indicative of an insignificant presence of pore mouth plugging. Analysis of the spent catalysts showed that the metals uptake of both catalysts were similar, at about 0.14 g metal/cc of catalyst.

This example demonstrates that upgrading of Athabasca bitumen in the presence of TMB as a solvent, a single-ring aromatic compound, at a moderate pressure of 800 psig (5516 kPa-g) can be achieved for an extended period of time without reactor plugging problems. Moreover, there is little metal buildup inside catalyst pores.

Example 4 (Comparative)

A fixed bed reactor similar to the reactor described in Example 3 was used. The reactor included two 50 cm brass half cylinders that were bolted onto a $\frac{3}{8}^{th}$ inch stainless steel tube. The volume of the hot zone inside the brass cylinder was identical to example 3. The volume of the hot zone inside the brass cylinder was 16.0 cc's. The reactor was loaded with 3 g (4.9 cc) of a supported NiMo hydroprocessing catalyst with a median pore diameter of greater than 150 Å on top of 9 g (7.6 cc) of a commercially available bulk NiMoW hydroprocessing catalyst with a median pore diameter of 94 Å. The supported NiMo catalyst was used primarily for removing metals from heavy oil feedstocks. The catalyst system was sulfided using a feedstock comprised of 80 wt % 130-neutral lube oil/20 wt % ethyl-disulfide.

The feedstock for sulfiding the catalyst system was processed at 3000 SCF/B (standard cubic feet of hydrogen per barrel of feed), at 340° C. (644° F.), 0.12 LHSV (liquid hourly space velocity), and 1000 psig (6895 kPa) for 48 hours. The feedstock was then switched to 95 wt % Athabasca bitumen and 5 wt % toluene. Reaction conditions were changed to 800 psig (5516 kPa-g). 5 cc/hr liquid feed (corresponding to an LHSV of 0.62 volumes of bitumen per volume of NiMoW catalyst per hour), and 1100 SCF/B hydrogen (197 S $m^3/m^3$). The reactor temperature was kept at 725° F. (385° C.).

The Athabasca bitumen had the following properties: 4.8 wt % S, 5000 wppm N, 55% wt % of the feed having a boiling point between 450° F. to 1050° F. (232° C. to 566° C.), 45 wt % of the feed corresponding to a 1050° F.+ (566° C.+) fraction, 0.9950 specific gravity at 60° F. (15.6° C.), 67 wppm Ni, 166 wppm V, and 13 wppm Fe. The reactor failed on pressure drop after 11.3 days of operation, which corresponds to processing of 57 volumes of bitumen per volume of NiMoW hydroprocessing catalyst before failure.

Table 1 provides a summary of these lifetime characterization runs in example 3 and 4.

TABLE 1

Catalyst Lifetime Dependence on Solvent

| Catalyst | Feed | Vol Resid/Vol Catalyst | AVG pore size (Angstroms) |
| --- | --- | --- | --- |
| Dual catalyst - Example 3 | 60% Athabasca bitumen/40% TMB | 2368 (150 days at 0.39 LHSV) | 94 (small pore) |
| Dual catalyst - Example 4 | 95% Athabasca bitumen/5% toluene | 57 (11.3 day sat 0.62 LHSV) | 94 (small pore) |

Example 5

A fixed bed reactor similar to the reactor described in Example 3 was used. The reactor included two 50 cm brass half cylinders that were bolted onto a 3/8th inch stainless steel tube. The volume of the hot zone inside the brass cylinder was 16.0 cc's. The center of the 16 cc hot zone was loaded with 5 cc's of a commercially available large pore NiMo/$Al_2O_3$ demetallation catalyst with a median pore diameter of greater than 150 Å followed by 7.6 cc's (9 g) of a commercially available bulk NiMoW catalyst (similar to the catalyst from Example 2) with a median pore diameter of about 94 Å. The catalyst was mounted into a standard down-flow pilot unit, and sulfided using standard procedures.

Athabasca bitumen was hydrotreated. The Athabasca bitumen had the following properties: 4.8 wt % S, 5000 wppm N, 55% wt % of the feed having a boiling point between 450° F. to 1050° F. (232° C. to 566° C.), 45 wt % of the feed corresponding to a 1050° F.+ (566° C.+) fraction, 0.9950 specific gravity at 60° F. (15.6° C.), 67 wppm Ni, 166 wppm V, and 13 wppm Fe. A feedstock was blended from 60 wt % Athabasca bitumen and 40 wt % 1,2,4-trimethylbenzene. A process variable study was conducted within the following condition window: 2-10 cc/hr liquid feed, 6-30 sccm hydrogen, 365-395° C. Pressure was constant at 800 psig (5.5 MPag). The deposition of metals in the reactor was tracked with time. At the time that the catalyst had accumulated 5 wt % metals, the product effluent at these conditions was analyzed using standard testing methods. 1050° F.+ (566° C.+) conversion was 23%, the amount of sulfur removal was 62%, and the amount of metals removal was 66%.

Example 6 (Comparative)

A fixed bed reactor similar to the reactor described in Example 3 was used. The reactor included two 50 cm brass half cylinders that were bolted onto a 3/8th inch stainless steel tube. The volume of the hot zone inside the brass cylinder was 21.0 cc's. The center of the 21 cc hot zone was loaded with 7 cc's (4.2 g) of a commercially available large pore NiMo/$Al_2O_3$ demetallation catalyst having a median pore size greater than 150 Å followed by 14 cc's (10.9 g) of a commercially available CoMo/$Al_2O_3$ hydroprocessing catalyst with a median pore size of at least about 150 Å. The catalyst was mounted into a standard down-flow pilot unit, and sulfided using standard procedures.

Athabasca bitumen was hydrotreated. The Athabasca bitumen had the following properties: 4.8 wt % S, 5000 wppm N, 55% wt % of the feed having a boiling point between 450° F. to 1050° F. (232° C. to 566° C.), 45 wt % of the feed corresponding to a 1050° F.+ (566° C.+) fraction, 0.9950 specific gravity at 60° F. (15.6° C.), 67 wppm Ni, 166 wppm V, and 13 wppm Fe. A feedstock was blended from 60 wt % Athabasca bitumen and 40 wt % 1,2,4-trimethylbenzene. A process variable study was conducted within the following condition window: 2-10 cc/hr liquid feed, 6-30 sccm hydrogen, 365-395° C. Pressure was constant at 800 psig (5.5 MPag). The deposition of metals in the reactor was tracked with time. At the time that the catalyst was estimated to have accumulated 5 wt % metals, the product effluent at these conditions was analyzed using standard testing methods. 1050° F.+ (566° C.+) conversion was 15%, the amount of sulfur removal was 71%, and the amount of metals removal was 74%.

Table 2 shows a comparison of the catalyst activities for the catalyst system including a small pore catalyst in Example 5 and a catalyst system using a large pore catalyst in Example 6. Comparison of Examples 5 and 6 demonstrate that the small pore (85 Å to 120 Å) hydroprocessing catalyst was roughly 50% more active for conversion of the 1050° F.+ (566° C.) portion of the feed as the conventional larger pore (>150 Å median pore size) resid hydroprocessing catalyst. On a volume basis, the small pore catalyst was also about twice as active as the large pore catalyst for desulfurization and demetallation, while on a volume basis the activities of the small pore catalyst and large pore catalyst were comparable. It is unexpected that a large pore catalyst designed to process resid would be less active than a small pore catalyst. It is also unexpected that vanadium is evenly distributed across the extrudate of a high activity, small pore hydrodesulfurization catalyst.

TABLE 2

Comparison of Small Pore and Large Pore Activities

| Example | Catalyst Configuration | Catalyst Weight ($2^{nd}$ catalyst) | Catalyst Volume ($2^{nd}$ Catalyst) | 1050° F.+ (566° C.+) Conversion (wt %) |
|---|---|---|---|---|
| 5 | Large pore/ Small pore | 9 g | 7.6 cc | 23 |
| 6 | Large pore/ Large pore | 10.9 g | 14 cc | 15 |

As shown in Table 1, use of a diluent provides about a factor of 40 improvement in catalyst lifetime. Conventionally, large pore hydroprocessing catalysts are believed to be superior for hydroprocessing of heavy oil feeds. However, as shown in Table 2 based on Examples 5 and 6, with an appropriate solvent, the catalyst system including the small pore hydroprocessing catalyst exhibited either a comparable or superior activity over the large pore hydroprocessing catalyst depending on the desired type of activity. This allows for use of a lesser amount of small pore catalyst while still achieving similar processing results.

Example 7

A fixed bed reactor was constructed from 3/8th inch stainless steel tubing. The reactor included two 50 cm brass half cylinders that were bolted onto a 3/8th inch stainless steel tube. The volume of the hot zone inside the brass cylinder was 12.0 cc's. 23 cc's (27 g) of a commercially available bulk NiMoW catalyst (similar to the catalyst from Example 3) with a median pore size of about 94 Å was loaded to completely fill the hot zone inside the brass cylinder and the entire rest of reactor volume in front of and in back of the hot zone. The catalyst was mounted into a standard down-flow pilot unit, and sulfided using standard procedures.

A feedstock was blended from 60 wt % of a demetallized 950° F.+ (510° C.+) vacuum resid and 40 wt % of recycled 300-600° F. (149-316° C.) distillate product (0.955 g/cc at 60° F.). The demetallized 950° F.+ (510° C.+) vacuum resid (no solvent) contained 20 wppm metals, 0.6 wt % sulfur, and 13 wt % hydrogen. 84% of the demetallized resid corresponded to material with a boiling point of 1050° F.+ (566° C.+). The demetallized vacuum resid was formed from distillation of a whole crude oil that was 18 wt % wax as measured by differential scanning calorimetry. The demetallized vacuum resid feedstock was pumped into the reactor at 3.0 cc/hr along with 10 sccm of hydrogen (1150 SCF/B of feed, about 195 $Nm^3/m^3$). The reactor was held at 445° C. The product effluent was analyzed using standard testing methods. The reactor consumed 360 SCF/B (about 60 $Nm^3/m^3$) of hydrogen, which corresponds to 600 SCF/B (about 100 $Nm^3/m^3$) relative to the demetallized 950° F.+ (510° C.+) vacuum resid, and corresponds to one third of the 1150 SCF/B (about 195 $Nm^3/m^3$) of hydrogen fed to the reactor. Less than 5 wt % of the recycled distillate was converted to products outside the distillate boiling range, making the yield of recycled distillate feed in the product between 38 and 40 wt %.

After removing and/or accounting for the recycled distillate cofeed, product yields from conversion of the demetallized 950° F.+ (510° C.+) vacuum resid were: 0.7 wt % $H_2S$; 5 wt % methane plus ethane; 5 wt % propane plus butanes; 20 wt % naphtha ($C_5$-400° F.); 37 wt % distillate (400° F.-650° F.); 24 wt % vacuum gas oil (650° F.-1050° F.; 343° C.-566° C.); and 8 wt % 1050° F.+ (566° C.+) material. The 1050° F.+ (566° C.+) conversion of the demetallized feed was 90%, the amount of sulfur removal was 99%, and the amount of metals removal was >99%. In preferred embodiments of the invention, the 1050° F.+ (566° C.+) conversion of the feed in the final liquid products from the primary reaction (i.e., "liquid effluent") is at least 80 wt %, more preferably at least 90 wt % or at least 95 wt %. In preferred embodiments of the invention, the amount of sulfur in the final liquid products (i.e., "liquid effluent") is less than 20 wt %, more preferably less than 10 wt %, less than 5 wt %, or most preferably, less than 1 wt % of the sulfur in the heavy oil feed. In preferred embodiments of the invention, the amount of metals in the final liquid products (i.e., "liquid effluent") is less than 20 wt %, more preferably less than 10 wt %, less than 5 wt %, or most preferably, less than 1 wt % of the metals in the heavy oil feed. A very low sulfur Bunker C Fuel Oil as described prior, can be made as a product from the vacuum gas oil and/or vacuum bottoms (1050° F.$^+$) streams in this process.

Returning to the example, the total liquid product was subjected to vacuum distillation. A 20% yield of 800° F.+ (427° C.+) product was isolated by vacuum distillation. Surprisingly, the recovered 800° F.+ (427° C.+) product was highly enriched in wax and polynuclear aromatic cores. Detailed analysis of the sample found that two thirds of the molecules were highly enriched in wax and one-third of the molecules were dealkylated polynuclear aromatics. NMR analysis found that 67% of the carbons in the dealkylated polynuclear aromatic molecules were aromatic, and less than 5 wt % of the carbons in the polynuclear aromatics were in sidechains with >8 carbons. Two thirds of the aliphatic protons in the polynuclear aromatics were either methyl groups or in CH and $CH_2$ groups attached to an aromatic ring. The fraction highly enriched in wax was found to contain 20 wt % n-paraffin (unbranched) wax and 10 wt % mono-methyl paraffin wax. The n-paraffin wax+monomethyl paraffin wax was concentrated in the 800° F.-1000° F. (427° C.-538° C.) boiling range ($C_{30}$ to $C_{40}$). Surprisingly, the fraction enriched in wax also contained a lot of aromatic molecules. NMR analysis of the fraction found that 25% of the carbons were aromatic and 22% of the carbons were epsilon carbons. The $C_{40}$+ molecules boiling above 1000° F. (538° C.) were enriched in aromatic molecules. The available analytical data indicates that more than half of the 1000° F.+ (538° C.+) molecules are benzene, naphthalene, and three-fused ring aromatics with long side chains (aromatic waxes).

It is surprising that a relatively simple, easily separated mixture of molecules was formed from hydroprocessing of crude oil vacuum resid. The example provides a method for producing conventional paraffin wax and an unusual 1000° F.+ (538° C.+) aromatic wax from resid.

The wax in the 800° F.+ (427° C.+) fraction can be separated out by any convenient method. After separation of the wax, the remaining portion of the 800° F.+ (427° C.+) fraction can be used as a low sulfur fuel oil. Based on the 99% sulfur removal, the amount of sulfur remaining in the product is about 0.03 wt % or less, which is below the desired target of less than 1 wt % sulfur for a low sulfur fuel oil. In an alternative embodiment, the 800° F.+ fraction can be used as a low sulfur fuel oil without performing a prior wax separation.

In this example, a distillate product with a boiling range of 300° F. (149° C.) to 600° F. (316° C.) was recycled for use as a solvent. In other embodiments, other distillate products suitable for use as a solvent include a distillate product where 90 wt % of the distillate product boils in a boiling range of 300° F. (149° C.) to 550° F. (288° C.); or 300° F. (149° C.) to 600° F. (316° C.); or 300° F. (149° C.) to 750° F. (399° C.); or 400° F. (204° C.) to 750° F. (399° C.).

Example 8

In this example, processes involving conversion of a lower percentage of feed followed by solvent deasphalting were compared with processes involving conversion of a higher percentage of a feed. In this example, processes involving deasphalting were performed using a configuration similar to FIG. 2 (atmospheric and vacuum distillation of hydroprocessed effluent follow by deasphalting of bottoms), while a comparative set of processes were performed using a configuration similar to FIG. 1.

In this example, a resid feedstock was processed under several types of conditions. The resid feedstock was a 650° F.+ (343° C.+) resid that contained 110 ppm of metals, 4.6 wt % sulfur, and 9.75 wt % hydrogen. The 1050° F.+ (566° C.+) portion of the resid feedstock corresponded to 42 wt % of the feed. The resid feedstock was used to form a combined feedstock containing 60 wt % of the resid feed and 40 wt % of trimethylbenzene as a solvent. The combined feedstock was processed under two types of hydroprocessing conditions. In a first set of process conditions, the resid feedstock was hydroprocessed to achieve about 66% conversion of the 1050° F.+ (566° C.+) portion of the feed with TMB solvent that operated for over 100 days at >60% conversion. In a second set of process conditions, the resid feedstock was processed to achieve about 88% conversion of the 1050° F.+ (566° C.+) portion of the feed. It is noted that under the second process conditions, the catalyst deactivated rapidly over 14 days of operation, indicating that the system was unstable under the higher severity process conditions even with the aid of the trimethylbenzene solvent.

Table 3 shows the product comparison from various ways of fractionating products from the two types of processes. In Table 3, the first row is showing the hydrogen content of the 1050° F.+ (566° C.+) portion of the feed, so the weight percentage of 1050° F.+ (566° C.+) is 100%. As shown in Table 3, a substantial amount of molecules with relatively large hydrogen to carbon ratios are present in the feed, based on the hydrogen to carbon ratio in the 1050° F.+ (566° C.+) portion of the feed of 1.43.

In order to separate the more valuable (i.e., higher hydrogen content) molecules in the 1050° F.+ (566° C.+) portion of the feed from molecules with lower hydrogen to carbon ratios, one option is to select severe hydroprocessing conditions for processing of the feed, such as conditions sufficient to convert 88% of the 1050° F.+(566° C.+) portion of the feedstock. As shown in the final row of Table 3, at 88% conversion (which leaves behind only 12 wt % of 1050° F.+ or 566° C.+ unconverted feed), some molecules with higher hydrogen to carbon ratios are still present, but overall the hydroprocessing is fairly effective at creating an atmospheric resid that contains only lower value molecules with low hydrogen content, as indicated by the hydrogen to carbon ratio of 0.80.

The results from hydroprocessing to achieve 66% conversion of the feed indicates that the remaining 34% of 1050° F.+

(566° C.+) material contains some good quality molecules, as the hydrogen to carbon ratio of 1.37 is not that different from the 1.43 hydrogen to carbon ratio of the 1050° F.+ (566° C.+) portion of the feed. However, the 1050° F.+ (566° C.+) portion (possibly formed as bottoms from a vacuum distillation) can then be exposed to pentane deasphalting in order to form a deasphalted oil and a $C_5$ deasphalting residue. After deasphalting, the deasphalted oil fraction (28% of the original 1050° F.+ or 566° C.+ material in the feed) has a hydrogen to carbon ratio of 1.48. By contrast, the $C_5$ deasphalting residue (6% of the original 1050° F.+ or 566° C.+ material) has a hydrogen to carbon ratio of 0.89, which is similar to the hydrogen to carbon ratio of 0.8 achieved under the processing conditions suitable for 88% conversion of the feedstock.

TABLE 3

Hydrogen to Carbon Ratio of Processed Resid Fractions

|  | H/C | Wt Yield (1050° F.+/ 566° C.+) |
|---|---|---|
| Resid feed 1050° F.+ portion | 1.43 | 100 |
| 66% 1050+ conv | 1.37 | 34 |
| a) 66% 1050+ conv deasphalted oil | 1.48 | 28.0 |
| b) 66% 1050+ conv $C_5$ deasphalting residue | 0.89 | 6.0 |
| 88% 1050+ conversion | 0.80 | 12 |

Based on these results, hydroprocessing under lower severity conditions followed by deasphalting was able to perform a comparable segregation of low hydrogen-to-carbon ratio molecules as performing hydroprocessing at much higher severity. In addition to reducing the hydrogen consumption required for conversion of the feed, the lower severity hydroprocessing conditions also allow for greater run lengths.

Additional Embodiments

Embodiment 1. A process for producing a hydroprocessed product, comprising: exposing a combined feedstock comprising a heavy oil feed component and a solvent component to a hydroprocessing catalyst under effective hydroprocessing conditions to form a hydroprocessed effluent, the effective hydroprocessing conditions including a partial pressure of hydrogen of about 1000 psia (6.9 MPa) or less, a temperature of at least about 360° C., and a liquid hourly space velocity of the fraction of the combined feedstock boiling above 1050° F. (566°) of at least about $0.10 hr^{-1}$; separating the hydroprocessing effluent to form at least a liquid effluent; and fractionating a first portion of the liquid effluent to form at least a distillate product and a bottoms product, the bottoms product having the bottoms product having an ASTM D6352 10% distillation point of at least about 600° F. (316° C.).

Embodiment 2. The process of Embodiment 1, wherein the solvent component comprises a recycle component, the process further comprising recycling a second portion of the liquid effluent to form the recycle component.

Embodiment 3. The process of Embodiment 2, wherein the ratio of the recycle component or solvent component to the heavy oil feed component on a weight basis is from about 0.3 to about 6.0, such as from about 0.5 to about 5.0.

Embodiment 4. The process of any of the above embodiments, wherein the effective hydroprocessing conditions comprise a partial pressure of hydrogen of about 800 psia (5.5 MPa) or less and/or a partial pressure of hydrogen of at least about 400 psia (2.8 MPa) and/or a partial pressure of hydrogen of at least about 650 psia (4.5 MPa) and/or a total pressure of about 1000 psig (6.9 MPag) or less, or a total pressure of about 800 psig (5.5 MPag) or less.

Embodiment 5. The process of any of the above embodiments, wherein the heavy oil feed component has an ASTM D6352 10% distillation point of at least 650° F. (343° C.), such as at least 750° F. (399° C.), or at least 900° F. (482° C.), or at least 950° F. (510° C.).

Embodiment 6. The process of any of the above embodiments, wherein the liquid hourly space velocity of the fraction of the combined feedstock boiling above 1050° F. (566° C.) is at least about $0.12 hr^{-1}$, such as at least about $0.18 hr^{-1}$.

Embodiment 7. The process of any of the above embodiments, further comprising performing solvent deasphalting on at least a portion of the bottoms product to form a deasphalted bottoms product and an asphalt product.

Embodiment 8. The process of Embodiment 7, wherein the effective hydroprocessing conditions are effective for conversion of from about 50 to about 70% of the 1050° F.+ (566° C.+) portion of the heavy oil feed component.

Embodiment 9. The process of Embodiment 8, further comprising performing a vacuum fractionation on at least a portion of the bottoms product to form at least a vacuum gas oil product and a vacuum bottoms product, wherein solvent deasphalting is performed on at least a portion of the vacuum bottoms product.

Embodiment 10. The process of Embodiment 9, wherein the heavy oil feed component comprises a first heavy oil feed portion and a second heavy oil feed portion, the method further comprising combining the vacuum bottoms product with the first heavy oil feed portion prior to solvent deasphalting, wherein the combined feedstock comprises the deasphalted bottoms product, the second heavy oil feed portion, and the solvent component.

Embodiment 11. The process of any of the above embodiments, wherein the solvent comprises at least a portion of the distillate product, at least 90 wt % of the at least a portion of the distillate product having a boiling point in a boiling range of 300° F. (149° C.) to 750° F. (399° C.), or in a boiling range of 300° F. (149° C.) to 600° F. (316° C.), or in a boiling range of 400° F. (204° C.) to 750° F. (399° C.).

Embodiment 12. The process of Embodiment 11, wherein 10 wt % or less, and preferably 5 wt % or less, of the at least a portion of the distillate product in the combined feedstock is converted to components having a boiling point of less than 300° F. during exposure of the combined feedstock to the effective hydroprocessing conditions.

Embodiment 13. The process of any of the above embodiments, wherein the solvent component comprises at least one single ring aromatic compound in which the solvent has an ASTM D86 10% distillation point of at least 120° C. (248° F.) and a 90% distillation point of not greater than 300° C. (572° F.).

Embodiment 14. The process of Embodiment 13, wherein the solvent component comprises more than one single-ring aromatic compound and none of the single-ring aromatic compounds has a boiling point of greater than 550° F. (288° C.).

Embodiment 15. The process of Embodiment 13 or 14, wherein the solvent component is comprised of at least 50 wt % of one or more single ring aromatic compounds.

Embodiment 16. The process of any of Embodiments 13-15, wherein at least one single-ring aromatic compound is trimethylbenzene.

Embodiment 17. The process of any of the above embodiments, wherein the heavy oil feed component has ASTM D6352 10% distillation point of at least 900° F. (482° C.), such as at least 950° F. (510° C.), the effective hydroprocessing conditions further comprising a temperature of at least about 420° C., such as at least 440° C., the effective hydroprocessing conditions being effective for at least about 90% conversion of the 1050° F.+ (566° C.+) portion of the combined feedstock, and wherein the bottoms product has an ASTM D6352 10% distillation point of at least about 650° F. (343° C.), such as at least about 750° F. (399° C.) or 800° F. (427° C.), a concentration of wax in the bottoms product being greater than a concentration of wax in the heavy oil feed component of the combined feedstock.

Embodiment 18. The process of any of the above embodiments, wherein the effective hydroprocessing conditions further comprising a temperature of at least about 420° C., such as about 440° C., the effective hydroprocessing conditions being effective for at least about 80% conversion of the 1050° F.+(566° C.+) portion of the combined feedstock, such as at least about 90% conversion, and at least about 75% desulfurization of the combined feedstock, such as at least about 80% desulfurization, and wherein the bottoms product has an ASTM D6352 10% distillation point of at least about 800° F. (427° C.) and a sulfur content of about 1.0wt% or less.

Embodiment 19. The process of Embodiment 18, wherein the heavy oil feed component has an ASTM D6352 10% distillation point of at least 900° F. (482° C.), such as at least 950° F.

The principles and modes of operation of this invention have been described above with reference to various exemplary and preferred embodiments. As understood by those of skill in the art, the overall invention, as defined by the claims, encompasses other preferred embodiments not specifically enumerated herein.

The invention claimed is:

1. A process for producing a hydroprocessed product, comprising:
   exposing a combined feedstock comprising a heavy oil feed component and a solvent component to a hydroprocessing catalyst under effective hydroprocessing conditions to form a hydroprocessed effluent, the effective hydroprocessing conditions including a partial pressure of hydrogen of about 1000 psia (6.9 MPa) or less, a temperature of at least about 360° C., and a liquid hourly space velocity of the fraction of the combined feedstock boiling above 1050° F. (566° C.) of at least about 0.10 hr$^{-1}$;
   separating the hydroprocessing effluent to form at least a liquid effluent; and
   fractionating a first portion of the liquid effluent to form at least a distillate product and a bottoms product, the bottoms product having an ASTM D6352 distillation point of at least about 600° F. (316° C.);
   wherein the solvent component comprises at least one single ring aromatic compound in which the solvent has an ASTM D86 10% distillation point of at least 120° C. (248° F.) and a 90% distillation point of not greater than 300° C. (572° F.); and
   wherein the at least one single-ring aromatic compound is trimethylbenzene.

2. The process of claim 1, wherein the solvent component comprises a recycle component, the process further comprising recycling a second portion of the liquid effluent to form the recycle component.

3. The process of claim 2, wherein the ratio of the recycle component to the heavy oil feed component on a weight basis is from about 0.3 to about 6.0.

4. The process of claim 1, wherein the effective hydroprocessing conditions comprise a partial pressure of hydrogen of about 800 psia (5.5 MPa) or less.

5. The process of claim 1, wherein the effective hydroprocessing conditions comprise a total pressure of about 1000 psig (6.9 MPag) or less.

6. The process of claim 1, wherein the liquid hourly space velocity of the fraction of the combined feedstock boiling above 1050° F. (566° C.) is at least about 0.12 hr$^{-1}$.

7. The process of claim 1, further comprising performing solvent deasphalting on at least a portion of the bottoms product to form a deasphalted bottoms product and an asphalt product.

8. The process of claim 7, wherein the effective hydroprocessing conditions are effective for conversion of from about 50 to about 70% of the 1050° F.+ (566° C.+) portion of the heavy oil feed component.

9. The process of claim 8, further comprising performing a vacuum fractionation on at least a portion of the bottoms product to form at least a vacuum gas oil product and a vacuum bottoms product, wherein solvent deasphalting is performed on at least a portion of the vacuum bottoms product.

10. The process of claim 9, wherein the heavy oil feed component comprises a first heavy oil feed portion and a second heavy oil feed portion, the method further comprising combining the vacuum bottoms product with the first heavy oil feed portion prior to solvent deasphalting, wherein the combined feedstock comprises the deasphalted bottoms product, the second heavy oil feed portion, and the solvent component.

11. The process of claim 1, wherein the solvent comprises at least a portion of the distillate product, at least 90 wt % of the at least a portion of the distillate product having a boiling point in a boiling range of 300° F. (149° C.) to 750° F. (399° C.).

12. The process of claim 11, wherein 10 wt % or less of the at least a portion of the distillate product in the combined feedstock is converted to components having a boiling point of less than 300° F. during exposure of the combined feedstock to the effective hydroprocessing conditions.

13. The process of claim 1, wherein the solvent component comprises more than one single-ring aromatic compound and none of the single-ring aromatic compounds has a boiling point of greater than 550° F. (288° C.).

14. The process of claim 1, wherein the solvent component is comprised of at least 50 wt % of one or more single ring aromatic compounds.

15. The process of claim 1, wherein the heavy oil feed component has ASTM D6352 10% distillation point of at least 900° F. (482° C.), the effective hydroprocessing conditions further comprising a temperature of at least about 420° C., the effective hydroprocessing conditions being effective for at least about 90% conversion of the 1050° F.+ (566° C.+) portion of the combined feedstock,
   and wherein the bottoms product has an ASTM D6352 10% distillation point of at least about 650° F. (343° C.), a concentration of wax in the bottoms product being greater than a concentration of wax in the heavy oil feed component of the combined feedstock.

16. The process of claim 15, wherein the effective hydroprocessing conditions comprise a temperature of at least about 440° C.

17. The process of claim 1, wherein the effective hydroprocessing conditions further comprise a temperature of at least about 420° C., the effective hydroprocessing conditions being effective for at least about 80% conversion of the 1050° F.+ (566° C.+) portion of the combined feedstock and at least about 75% desulfurization of the combined feedstock, and wherein the bottoms product has an ASTM D6352 10% distillation point of at least about 800° F. (427° C.) and a sulfur content of about 1.0 wt % or less.

18. The process of claim 17, wherein the heavy oil feed component has an ASTM D6352 10% distillation point of at least 900° F. (482° C.).

19. The process of claim 18, wherein the heavy oil feed component has a sulfur content of at least 3 wt %.

20. The process of claim 19, wherein the liquid effluent has a sulfur content of less than 5 wt % of the heavy oil feed component and has a metals content of less than 5 wt % of the heavy oil feed component.

21. The process of claim 20, wherein the effective hydroprocessing conditions being effective for at least about 90% conversion of the 1050° F.+ (566° C.+) portion of the combined feedstock.

* * * * *